US012807413B2

(12) United States Patent
Romano et al.

(10) Patent No.: US 12,807,413 B2
(45) Date of Patent: Nov. 24, 2026

(54) SYSTEMS AND METHODS FOR PROVIDING AN OPERATOR INDUCTED ROBOTIC PUT WALL

(71) Applicant: Berkshire Grey Operating Company, Inc., Bedford, MA (US)

(72) Inventors: Joseph Romano, Arlington, MA (US); Christopher Buck, Stow, MA (US); Thomas Allen, Reading, MA (US); Christopher Geyer, Arlington, MA (US); Victoria Hinchey, Winchester, MA (US); Charles Baptista, Arlington, MA (US); Jacob Torrey, Tyngsboro, MA (US); Ryan O'Hern, Reading, MA (US); Andrew Ewart, Stratham, NH (US); John Richard Amend, Jr., Fort Collins, CO (US); Prasanna Velagapudi, Pittsburgh, PA (US); Benjamin Cohen, White Plains, NY (US); Guoming Alex Long, Wexford, PA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 1081 days.

(21) Appl. No.: 17/738,346

(22) Filed: May 6, 2022

(65) Prior Publication Data

US 2022/0356017 A1 Nov. 10, 2022

Related U.S. Application Data

(60) Provisional application No. 63/185,546, filed on May 7, 2021.

(51) Int. Cl.
*B65G 1/137* (2006.01)
*B65G 1/04* (2006.01)
(Continued)

(52) U.S. Cl.
CPC ......... *B65G 1/1373* (2013.01); *B65G 1/0407* (2013.01); *B65G 1/10* (2013.01);
(Continued)

(58) Field of Classification Search
CPC .................. B65G 1/1373; B65G 1/10; B65G 2203/0241; B65G 2203/0283; B65G 2203/044; B65G 1/08; B07C 5/36
See application file for complete search history.

(56) References Cited

U.S. PATENT DOCUMENTS 1,043,524 A * 11/1912 Lert ...................... D03D 15/56 139/422
3,750,804 A 8/1973 Lemelson
(Continued)

FOREIGN PATENT DOCUMENTS

CA 3043018 A1 5/2018
CA 3057334 A1 9/2018
(Continued)

OTHER PUBLICATIONS

KR20200027292 EN translation with paragraph numbers espacenet (Year: 2018).*
(Continued)

*Primary Examiner* — Jacob S. Scott
(74) *Attorney, Agent, or Firm* — Gesmer Updegrove LLP

(57) ABSTRACT

An operator inducted object processing system is disclosed that includes an object induction station at which objects are provided for processing, said object induction station including at least one perception unit for providing perception data regarding an object, an object processing system for receiving objects from the object induction station, said object processing system including a carrier configured for movement in a first generally horizontal direction between two mutually opposing arrays of destination locations, each of
(Continued)

which extends along the first generally horizontal direction, and the carrier also being configured for movement in a second generally vertical direction between the two mutually opposing arrays of destination locations, each of which also extends along the second generally vertical direction, wherein the movement in the first generally horizontal direction is independent of the movement in the second generally vertical direction, and wherein the carrier is further configured for movement in mutually opposing third directions that are generally orthogonal to the first and second directions, for urging an object thereon into a first end of an adjacent selected destination location, each of the destination locations including a first end that is accessible by the carrier, and a plurality of object collection stations, each of which is associated with a second end of each of the destination locations.

56 Claims, 26 Drawing Sheets

(51) Int. Cl.
*B65G 1/10* (2006.01)
*B66C 5/00* (2006.01)
*B66C 6/00* (2006.01)
*B66C 7/00* (2006.01)
*B66C 9/00* (2006.01)
*B66F 9/07* (2006.01)
*B66F 9/14* (2006.01)

(52) U.S. Cl.
CPC .................. *B66C 5/00* (2013.01); *B66C 6/00* (2013.01); *B66C 7/00* (2013.01); *B66C 9/00* (2013.01); *B66F 9/07* (2013.01); *B66F 9/141* (2013.01); *B65G 2203/0241* (2013.01); *B65G 2203/0283* (2013.01); *B65G 2203/044* (2013.01)

(56) References Cited

U.S. PATENT DOCUMENTS 3,756,433 A * 9/1973 Richins ................ B65G 1/0435 414/280
3,951,276 A 4/1976 Moses
4,307,988 A 12/1981 Page et al.
4,542,808 A 9/1985 Lloyd, Jr. et al.
4,622,875 A 11/1986 Emery et al.
4,678,390 A 7/1987 Bonneton et al.
4,722,653 A 2/1988 Williams et al.
4,756,657 A * 7/1988 Kinney ................ B65G 1/0435 414/280
4,815,582 A 3/1989 Canziani
4,846,335 A 7/1989 Hartlepp
4,895,242 A 1/1990 Michel
5,190,162 A 3/1993 Harlepp
5,271,703 A 12/1993 Lindqvist et al.
5,595,263 A 1/1997 Pignataro
5,647,473 A 7/1997 Miller et al.
5,794,789 A 8/1998 Payson et al.
5,875,434 A 2/1999 Matsuoka et al.
6,006,946 A 12/1999 Williams et al.
6,076,023 A 6/2000 Sato
6,189,702 B1 2/2001 Bonnet
6,208,908 B1 3/2001 Boyd et al.
6,246,023 B1 6/2001 Kugle
6,290,055 B1 * 9/2001 Glorfield ................ B65G 47/44 198/550.01
6,377,867 B1 4/2002 Bradley et al.
6,505,093 B1 1/2003 Thatcher et al.
6,513,641 B1 2/2003 Affaticati et al.
6,688,459 B1 2/2004 Bonham et al.
6,705,528 B2 3/2004 Good et al.
6,762,382 B1 7/2004 Danelski
6,824,345 B2 11/2004 Hansl et al.
7,861,844 B2 1/2011 Hayduchok et al.
8,303,233 B2 * 11/2012 Solomon ................ B65G 1/127 414/277
8,718,814 B1 5/2014 Clark et al.
8,776,694 B2 7/2014 Rosenwinkel et al.
8,798,784 B1 8/2014 Clark et al.
8,851,272 B1 10/2014 Hill
9,020,632 B2 4/2015 Naylor
9,272,845 B2 3/2016 Honkanen et al.
9,364,865 B2 6/2016 Kim
9,481,518 B2 11/2016 Neiser
9,694,977 B2 7/2017 Aprea et al.
9,937,532 B2 4/2018 Wagner et al.
9,975,148 B2 5/2018 Zhu et al.
9,996,805 B1 * 6/2018 Lisso ...................... B65B 35/00
10,007,827 B2 6/2018 Wagner et al.
10,029,865 B1 7/2018 McCalib, Jr. et al.
10,086,998 B1 10/2018 Tilekar et al.
10,438,034 B2 10/2019 Wagner et al.
10,518,974 B2 12/2019 Lee et al.
10,577,180 B1 3/2020 Mehta et al.
10,596,696 B2 3/2020 Wagner et al.
10,632,610 B2 4/2020 Wagner et al.
10,633,186 B2 * 4/2020 Valinsky .............. B65G 1/1375
10,649,445 B2 5/2020 Wagner et al.
10,730,077 B2 8/2020 Wagner et al.
10,843,333 B2 11/2020 Wagner et al.
10,894,674 B2 1/2021 Wagner et al.
10,906,740 B2 2/2021 Wagner et al.
11,020,770 B1 6/2021 Tilekar et al.
11,305,947 B1 * 4/2022 Singleton ............... B65G 21/00
11,338,999 B2 5/2022 Hu
11,472,633 B2 10/2022 Wagner et al.
11,666,944 B1 * 6/2023 De La Rosa ............. B07C 5/36 209/549
12,258,216 B2 * 3/2025 Kalouche ............. B65G 1/0485
2002/0091801 A1 7/2002 Lewin et al.
2002/0179400 A1 12/2002 Dersham et al.
2002/0179502 A1 12/2002 Cerutti et al.
2003/0218307 A1 11/2003 Anderson et al.
2003/0218807 A1 11/2003 Handa et al.
2004/0126210 A1 * 7/2004 Hansl ...................... B66F 9/141 414/281
2005/0002762 A1 1/2005 Gambarelli et al.
2006/0045672 A1 3/2006 Maynard et al.
2008/0181753 A1 7/2008 Bastian et al.
2009/0129902 A1 5/2009 Schafer
2010/0036675 A1 2/2010 Schäfer
2010/0096243 A1 4/2010 Balk
2010/0300842 A1 12/2010 Bastian, II et al.
2010/0316469 A1 12/2010 Lert et al.
2011/0056806 A1 3/2011 Johnson
2011/0144798 A1 6/2011 Freudelsperger
2011/0262253 A1 10/2011 Krizmanic et al.
2012/0029687 A1 2/2012 Hagen et al.
2012/0128454 A1 5/2012 Hayduchok et al.
2012/0177465 A1 7/2012 Koholka
2012/0328397 A1 12/2012 Yamashita
2013/0051696 A1 2/2013 Garrett et al.
2014/0031972 A1 1/2014 DeWitt et al.
2014/0056672 A1 2/2014 Mathys et al.
2014/0086714 A1 3/2014 Malik
2014/0142746 A1 5/2014 Vegh et al.
2014/0212257 A1 7/2014 Yamashita
2014/0244026 A1 8/2014 Neiser
2014/0277692 A1 9/2014 Buzan et al.
2014/0277693 A1 9/2014 Naylor
2014/0288696 A1 9/2014 Lert
2015/0098775 A1 4/2015 Razumov
2015/0225187 A1 * 8/2015 Razumov ............. B65G 1/0492 414/807
2015/0294260 A1 10/2015 Napoli
2016/0107848 A1 4/2016 Baker
2016/0122135 A1 5/2016 Bastian, II

(56) References Cited

U.S. PATENT DOCUMENTS

| | | | | |
|---|---|---|---|---|
| 2016/0221757 | A1 | 8/2016 | DeWitt et al. | |
| 2016/0355337 | A1 | 12/2016 | Lert et al. | |
| 2017/0015502 | A1 | 1/2017 | Engel et al. | |
| 2017/0043953 | A1 | 2/2017 | Battles et al. | |
| 2017/0057756 | A1 | 3/2017 | Dugat et al. | |
| 2017/0136632 | A1 | 5/2017 | Wagner et al. | |
| 2017/0173638 | A1 | 6/2017 | Wagner et al. | |
| 2017/0267452 | A1 | 9/2017 | Goren et al. | |
| 2017/0330135 | A1 | 11/2017 | Taylor et al. | |
| 2017/0349385 | A1 | 12/2017 | Maroni et al. | |
| 2018/0022582 | A1* | 1/2018 | Passmann | E04C 3/005 212/324 |
| 2018/0037410 | A1 | 2/2018 | DeWitt | |
| 2018/0057264 | A1 | 3/2018 | Wicks et al. | |
| 2018/0075402 | A1 | 3/2018 | Stadie et al. | |
| 2018/0085788 | A1 | 3/2018 | Engel | |
| 2018/0105363 | A1 | 4/2018 | Lisso | |
| 2018/0208397 | A1 | 7/2018 | Schack et al. | |
| 2018/0251302 | A1 | 9/2018 | Valinsky et al. | |
| 2018/0265311 | A1 | 9/2018 | Wagner et al. | |
| 2018/0273296 | A1 | 9/2018 | Wagner et al. | |
| 2018/0273298 | A1 | 9/2018 | Wagner et al. | |
| 2018/0282066 | A1 | 10/2018 | Wagner et al. | |
| 2018/0290830 | A1 | 10/2018 | Valinsky et al. | |
| 2018/0327198 | A1 | 11/2018 | Wagner et al. | |
| 2018/0354719 | A1 | 12/2018 | Hoffman | |
| 2019/0168392 | A1* | 6/2019 | Väin | G06Q 10/00 |
| 2019/0218033 | A1 | 7/2019 | Muttathil et al. | |
| 2019/0329979 | A1 | 10/2019 | Wicks et al. | |
| 2020/0005005 | A1 | 1/2020 | Wagner et al. | |
| 2020/0016746 | A1 | 1/2020 | Yap et al. | |
| 2020/0039745 | A1 | 2/2020 | Khodl et al. | |
| 2020/0152259 | A1* | 5/2020 | DeWitt | B65G 1/0485 |
| 2020/0265380 | A1 | 8/2020 | Dubois et al. | |
| 2020/0302390 | A1 | 9/2020 | Elazary et al. | |
| 2020/0407178 | A1 | 12/2020 | Battles et al. | |
| 2021/0039140 | A1 | 2/2021 | Geyer et al. | |
| 2021/0039881 | A1 | 2/2021 | Zhu et al. | |
| 2021/0039887 | A1 | 2/2021 | Zhu et al. | |
| 2021/0047117 | A1 | 2/2021 | Stevens et al. | |
| 2021/0047118 | A1 | 2/2021 | Stevens et al. | |
| 2021/0178826 | A1 | 6/2021 | Lutz et al. | |
| 2021/0188554 | A1* | 6/2021 | Kalouche | B07C 3/008 |
| 2021/0237260 | A1* | 8/2021 | Holopainen | B25J 11/008 |
| 2021/0237262 | A1* | 8/2021 | Holopainen | B25J 17/0225 |
| 2021/0276796 | A1 | 9/2021 | Long | |
| 2021/0276797 | A1 | 9/2021 | Velagapudi et al. | |
| 2021/0276798 | A1 | 9/2021 | Velagapudi et al. | |
| 2021/0276799 | A1 | 9/2021 | Velagapudi et al. | |
| 2021/0300685 | A1 | 9/2021 | Dieges et al. | |
| 2021/0394807 | A1 | 12/2021 | Kontuniemi et al. | |
| 2022/0089387 | A1 | 3/2022 | Dederichs et al. | |
| 2022/0106122 | A1* | 4/2022 | Tie | B65G 1/1378 |
| 2022/0234825 | A1 | 7/2022 | Krishnamoorthy et al. | |
| 2022/0284393 | A1 | 9/2022 | Al et al. | |
| 2022/0356017 | A1* | 11/2022 | Romano | B07C 5/36 |
| 2023/0077893 | A1 | 3/2023 | Gebhardt et al. | |
| 2023/0112778 | A1 | 4/2023 | O'Hern et al. | |
| 2023/0119061 | A1 | 4/2023 | Halamka et al. | |
| 2023/0137545 | A1 | 5/2023 | Austrheim | |
| 2023/0144252 | A1* | 5/2023 | Lukka | B07C 5/36 414/752.1 |
| 2023/0150770 | A1 | 5/2023 | Sebastian | |
| 2023/0219767 | A1 | 7/2023 | Demir et al. | |
| 2023/0249914 | A1 | 8/2023 | Fosnight et al. | |
| 2023/0271785 | A1 | 8/2023 | Gravelle et al. | |
| 2023/0331475 | A1 | 10/2023 | Yamashita | |
| 2023/0405639 | A1* | 12/2023 | Holopainen | B07C 5/36 |
| 2024/0425289 | A1 | 12/2024 | Velagapudi et al. | |
| 2025/0136385 | A1 | 5/2025 | Raja et al. | |
| 2025/0153938 | A1 | 5/2025 | Velagapudi et al. | |
| 2025/0197113 | A1 | 6/2025 | Velagapudi et al. | |

FOREIGN PATENT DOCUMENTS

| | | | | | |
|---|---|---|---|---|---|
| CN | 102001506 | A | | 4/2011 | |
| CN | 102264602 | A | | 11/2011 | |
| CN | 103332426 | A | | 10/2013 | |
| CN | 104169196 | A | | 11/2014 | |
| CN | 104859990 | A | | 8/2015 | |
| CN | 104925440 | A | | 9/2015 | |
| CN | 205257168 | U | | 5/2016 | |
| CN | 105858042 | A | | 8/2016 | |
| CN | 205820147 | U | | 12/2016 | |
| CN | 104495181 | B | | 2/2017 | |
| CN | 206456846 | U | | 9/2017 | |
| CN | 107635896 | A | | 1/2018 | |
| CN | 107720072 | A | | 2/2018 | |
| CN | 108146948 | A | | 6/2018 | |
| CN | 108700869 | A | | 10/2018 | |
| CN | 109081027 | A | | 12/2018 | |
| CN | 110062740 | A | | 7/2019 | |
| CN | 110325462 | A | | 10/2019 | |
| CN | 209506761 | U | | 10/2019 | |
| CN | 110431097 | A | | 11/2019 | |
| CN | 110461734 | A | | 11/2019 | |
| CN | 110462657 | A | | 11/2019 | |
| CN | 209720654 | U | | 12/2019 | |
| CN | 110662707 | A | | 1/2020 | |
| CN | 110691742 | A | | 1/2020 | |
| CN | 110740954 | A | | 1/2020 | |
| CN | 110803439 | A | | 2/2020 | |
| CN | 110976303 | A | | 4/2020 | |
| CN | 111674633 | A | | 9/2020 | |
| CN | 115210152 | A | | 10/2022 | |
| CN | 115243987 | A | | 10/2022 | |
| CN | 115243988 | A | | 10/2022 | |
| CN | 117255718 | A | | 12/2023 | |
| CN | 118139798 | A | | 6/2024 | |
| DE | 102004014378 | A1 | | 10/2005 | |
| DE | 102008046325 | A1 | | 3/2010 | |
| DE | 102013006391 | A1 | * | 10/2014 | B65G 1/0421 |
| EP | 1151942 | A2 | | 11/2001 | |
| EP | 2818433 | A1 | | 12/2014 | |
| EP | 3354598 | A1 | | 8/2018 | |
| EP | 3572355 | A1 | | 11/2019 | |
| EP | 4114766 | A2 | | 1/2023 | |
| EP | 4114767 | A1 | | 1/2023 | |
| EP | 4114768 | A1 | | 1/2023 | |
| EP | 4114769 | A1 | | 1/2023 | |
| EP | 4334045 | A2 | | 3/2024 | |
| GB | 2605428 | A | * | 10/2022 | C25C 7/06 |
| JP | S5826703 | A | | 2/1983 | |
| JP | S6015302 | A | | 1/1985 | |
| JP | 2007131383 | A | | 5/2007 | |
| JP | 2003104513 | A | | 4/2009 | |
| JP | 2013052958 | A | | 3/2013 | |
| JP | 2008110779 | A | | 5/2015 | |
| JP | 2009035407 | A | | 2/2019 | |
| KR | 20200027292 | A | * | 3/2020 | A62C 3/002 |
| TW | 201300298 | A | | 1/2013 | |
| WO | 2007009136 | A1 | | 1/2007 | |
| WO | 2009089159 | A2 | | 7/2009 | |
| WO | 2010040809 | A1 | | 4/2010 | |
| WO | 2011012611 | A1 | | 2/2011 | |
| WO | 2012106744 | A1 | | 8/2012 | |
| WO | 2014080041 | A1 | | 5/2014 | |
| WO | 2016105201 | A2 | | 6/2016 | |
| WO | 2017123678 | A1 | | 7/2017 | |
| WO | 2018175466 | A1 | | 9/2018 | |
| WO | 2018195196 | A1 | | 10/2018 | |
| WO | 2021026359 | A1 | | 2/2021 | |
| WO | 2021178819 | | | 9/2021 | |
| WO | 2021178830 | A1 | | 9/2021 | |
| WO | 2022236038 | A2 | | 11/2022 | |

(56) References Cited

FOREIGN PATENT DOCUMENTS

| | | |
|---|---|---|
| WO | 2023064465 A1 | 4/2023 |
| WO | 2025090546 A1 | 5/2025 |

OTHER PUBLICATIONS

DE_102013006391 (Year: 2014).*
KR_20200027292 (Year: 2020).*
Communication pursuant to Rules 161(1) and 162 EPC issued by the European Patent Office in related European Patent Application No. 21715372.5 on Oct. 13, 2022, 3 pages.
International Search Report and Written Opinion of the International Searching Authority, the European Patent Office, issued in related International Application No. PCT/US2022/046561 on Feb. 13, 2023, 13 pages.
Examiner's Report issued by the Innovation, Science and Economic Development Canada (Canadian Intellectual Property Office) in related Canadian Patent Application No. 3,174,544 on Nov. 6, 2023, 4 pages.
Examiner's Report issued by the Innovation, Science and Economic Development Canada (Canadian Intellectual Property Office) in related Canadian Patent Application No. 3,174,546 on Nov. 7, 2023, 4 pages.
International Preliminary Report on Patentability issued by the International Bureau of WIPO in related International application No. PCT/US2022/028047 on Oct. 24, 2023, 14 pages.
Non-Final Office Action issued by the United States Patent and Trademark Office in related U.S. Appl. No. 17/193,378, filed Aug. 4, 2023, 26 pages.
Notice of First Office Action, along with its English translation, issued by the China National Intellectual Property Office in related Chinese Patent Application No. 202180018333.5 on Mar. 31, 2023, 32 pages.
Notice of First Office Action, along with its English translation, issued by the China National Intellectual Property Office in related Chinese Patent Application No. 202180018436.1 on Mar. 31, 2023, 17 pages.
Notice on the First Office Action, along with its English translation, issued by the China National Intellectual Property Administration, in related Chinese Patent Application No. 202180018364.0 on Mar. 30, 2023, 23 pages.
Notice on the First Office Action, along with its English translation, issued by the China National Intellectual Property Administration, in related Chinese Patent Application No. 202180018310.4 on Mar. 30, 2023, 21 pages.
Notice on the Second Office Action, along with its English translation, issued by the China National Intellectual Property Administration in related Chinese Patent Application No. 202180018310.4 on Oct. 11, 2023, 24 pages.
Notice on the Second Office Action, along with its English translation, issued by the China National Intellectual Property Administration in related Chinese Patent Application No. 202180018333.5 on Oct. 12, 2023, 35 pages.
Notice on the Second Office Action, along with its English translation, issued by the China National Intellectual Property Administration in related Chinese Patent Application No. 202180018364.0 on Oct. 11, 2023, 19 pages.
Chapter 5 High-bay Warehouses and equipment thereof of Modern Machinery and Equipment Design Manual, vol. 3, Non-Standard Machinery and Equipment Design, edited by Fan Zuyao, pp. 16-261, China Machine Press, Oct. 1996, 11 pages.
International Search Report and Written Opinion of the International Searching Authority issued by the European Patent Office, as the International Searching Authority, in related International application No. PCT/US2024/052472 on Jan. 22, 2025, 14 pages.
Annex to Form PCT/ISA/206, Communication Relating to the Results of the Partial International Search and Provisional Opinion Accompanying the Partial Search Result issued by the International Searching Authority, the European Patent Office, in related International Application No. PCT/US2021/021140 on Jul. 6, 2021, 2 pages.
Annex to Form PCT/ISA/206, Communication Relating to the Results of the Partial International Search issued by the European Patent Office, as the International Searching Authority, in related International Application No. PCT/US2022/028047 on Sep. 22, 2022, 2 pages.
Communication pursuant to Rules 161(1) and 162 EPC issued by the European Patent Office in related European Patent Application No. 21714588.7 on Oct. 13, 2022, 3 pages.
Communication pursuant to Rules 161(1) and 162 EPC issued by the European Patent Office in related European Patent Application No. 21714590.3 on Oct. 13, 2022, 3 pages.
Communication pursuant to Rules 161(1) and 162 EPC issued by the European Patent Office in related European Patent Application No. 21714592.9 on Oct. 13, 2022, 3 pages.
International Preliminary Report on Patentability and the International Preliminary Report on Patentability issued by the International Bureau of WIPO in related International Application No. PCT/US2021/021118 on Sep. 6, 2022, 9 pages.
International Preliminary Report on Patentability issued by the International Bureau of WIPO in related International Application No. PCT/US2021/021128 on Sep. 6, 2022, 8 pages.
International Preliminary Report on Patentability issued by the International Bureau of WIPO in related International Application No. PCT/US2021/021133 on Sep. 6, 2022, 7 pages.
International Preliminary Report on Patentability issued by the International Bureau of WIPO in related International Application No. PCT/US2021/021140 on Sep. 15, 2022, 10 pages.
International Search Report and Written Opinion issued by the International Searching Authority (the European Patent Office) in related International Application No. PCT/US2021/021128 on Jun. 21, 2021, 12 pages.
International Search Report and Written Opinion issued by the International Searching Authority (the European Patent Office) in related International Application No. PCT/US2021/021140 on Sep. 3, 2021, 16 pages.
International Search Report and Written Opinion of the International Searching Authority, the European Patent Office, issued in related International Application No. PCT/US2021/021118 on Jul. 16, 2021, 12 pages.
International Search Report and Written Opinion of the International Searching Authority issued by the European Patent Office in related International Application No. PCT/US2021/021133 on Jun. 21, 2021, 11 pages.
International Search Report and the Written Opinion of the International Searching Authority, or the Declaration, and the International Search Report and Written Opinion of the International Searching Authority (the European Patent Office) issued in related International Application No. PCT/US2022/028047 on Nov. 14, 2022, 20 pages.
Communication pursuant to Rules 161(1) and 162 EPC issued by the European Patent Office in related European Patent Application No. 22727547.6 on Dec. 14, 2023, 3 pages.
Examiner's Report issued by the Innovation, Science and Economic Development Canada (Canadian Intellectual Property Office) in related Canadian Patent Application No. 3,174,543 on Nov. 6, 2023, 4 pages.
Examiner's Report issued by the Innovation, Science and Economic Development Canada (Canadian Intellectual Property Office) in related Canadian Patent Application No. 3,174,552 on Nov. 29, 2023, 6 pages.
International Preliminary Report on Patentability issued by the International Bureau of WIPO in related international application No. PCT/US2022/046561 on Apr. 16, 2024, 7 pages.
Non-Final Office Action issued by the United States Patent and Trademark Office in related U.S. Appl. No. 17/193,377, filed Mar. 21, 2024, 44 pages.
Non-Final Office Action issued by the United States Patent and Trademark Office in related U.S. Appl. No. 17/193,380, filed Mar. 27, 2024, 40 pages.

(56) References Cited

OTHER PUBLICATIONS

Non-Final Office Action issued by the United States Patent and Trademark Office in related U.S. Appl. No. 17/193,384, filed Apr. 5, 2024, 38 pages.
Notice of Third Office Action, along with its English translation, issued by the China National Intellectual Property Administration in related Chinese Patent Application No. 202180018310.4 on Apr. 17, 22 pages.
Notice of Third Office Action, along with its English translation, issued by the China National Intellectual Property Administration in related Chinese Patent Application No. 202180018333.5 on Apr. 17, 31 pages.
Notice of Third Office Action, along with its English translation, issued by the China National Intellectual Property Administration in related Chinese Patent Application No. 202180018364.0 on Apr. 17, 2024, 24 pages.

* cited by examiner

SYSTEMS AND METHODS FOR PROVIDING AN OPERATOR INDUCTED ROBOTIC PUT WALL

PRIORITY

The present application claims priority to U.S. Provisional Patent Application No. 63/185,546, filed May 7, 2021, the disclosure of which is hereby incorporated by reference in its entirety.

BACKGROUND

The invention generally relates to object processing systems, and relates in particular to object processing systems such as automated storage and retrieval systems, distribution center systems, and sortation systems that are used for processing a variety of objects.

Current object processing systems generally involve the processing of a large number of objects, where the objects are received in either organized or disorganized batches, and must be routed to desired destinations in accordance with a manifest or specific addresses on the objects (e.g., in a mailing/delivery system).

Automated storage and retrieval systems (AS/RS), for example, generally include computer-controlled systems for automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

Current distribution center sorting systems, for example, generally assume an inflexible sequence of operations whereby a disorganized stream of input objects is first singulated into a single stream of isolated objects presented one at a time to a scanner that identifies the object. An induction element (e.g., a conveyor, a tilt tray, or manually movable bins) transport the objects to the desired destination or further processing station, which may be a bin, an inclined shelf, a chute, a bag or a conveyor etc.

In parcel sortation systems, human workers or automated systems typically retrieve parcels in an arrival order, and sort each parcel or object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Current state-of-the-art sortation systems rely on human labor to some extent. Most solutions rely on a worker that is performing sortation, by scanning an object from an induction area (chute, table, etc.) and placing the object in a staging location, conveyor, or collection bin. When a bin is full or the controlling software system determines that it needs to be emptied, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Adding to these challenges are the conditions that some objects may have information about the object entered into the manifest or a shipping label incorrectly. For example, if a manifest in a distribution center includes a size or weight for an object that is not correct (e.g., because it was entered manually incorrectly), or if a shipping sender enters an incorrect size or weight on a shipping label, the processing system may reject the object as being unknown. Additionally, and with regard to incorrect information on a shipping label, the sender may have been undercharged due to the erroneous information, for example, if the size or weight was entered incorrectly by the sender.

There remains a need for more efficient and more cost-effective object processing systems that processes objects of a variety of sizes and weights into appropriate collection bins or boxes, yet is efficient in handling objects of such varying sizes and weights.

SUMMARY

In accordance with an aspect, the invention provides an operator inducted object processing system including an object induction station at which objects are provided for processing, said object induction station including at least one perception unit for providing perception data regarding an object, an object processing system for receiving objects from the object induction station, said object processing system including a carrier configured for movement in a first generally horizontal direction between two mutually opposing arrays of destination locations, each of which extends along the first generally horizontal direction, and the carrier also being configured for movement in a second generally vertical direction between the two mutually opposing arrays of destination locations, each of which also extends along the second generally vertical direction, wherein the movement in the first generally horizontal direction is independent of the movement in the second generally vertical direction, and wherein the carrier is further configured for movement in mutually opposing third directions that are generally orthogonal to the first and second directions, for urging an object thereon into a first end of an adjacent selected destination location, each of the destination locations including a first end that is accessible by the carrier, and a plurality of object collection stations, each of which is associated with a second end of each of the destination locations.

In accordance with another aspect, the invention provides an operator inducted object processing system including an object induction station at which objects are provided for processing, said object induction station including a first end of a conveyance system, and at least one perception unit for providing perception data regarding an object, an object processing system including a second end of the conveyance system, for receiving objects from the object induction station, said object processing system including a carrier configured for movement in a first generally horizontal direction adjacent an array of destination locations that extend along the first generally horizontal direction, and the carrier also being configured for movement in a second generally vertical direction adjacent the array of destination locations that also extend along the second generally vertical direction, wherein the movement in the first generally horizontal direction may be at the same time as the movement in the second generally vertical direction, and wherein the carrier is further configured for movement in a third direction that is generally orthogonal to the first and second directions, for urging an object thereon into a first end of an adjacent selected destination location, each of the destination locations including a first end that is accessible by the carrier, and a plurality of object collection stations, each of which is associated with a second end of each of the destination locations.

In accordance with a further aspect, the invention provides a method of processing objects including receiving objects at an object induction station at which objects are provided for processing, said object induction station including at least one perception unit for providing perception data regarding an object, receiving objects from the object induction station on a carrier, moving the carrier simultaneously both in a first generally horizontal direction between two mutually opposing arrays of destination locations, each of which extends along the first generally horizontal direction, and in a second generally vertical direction between the two mutually opposing arrays of destination locations, each of which also extends along the second generally vertical direction, moving the carrier in either of mutually opposing third directions that are generally orthogonal to the first and second directions, for urging an object thereon into a first end of an adjacent selected destination location, each of the destination locations including a first end that is accessible by the carrier, and receiving objects at a plurality of object collection stations, each of which is associated with a second end of each of the destination locations.

BRIEF DESCRIPTION OF THE DRAWINGS

The following description may be further understood with reference to the accompanying drawing in which.

Figure 1:
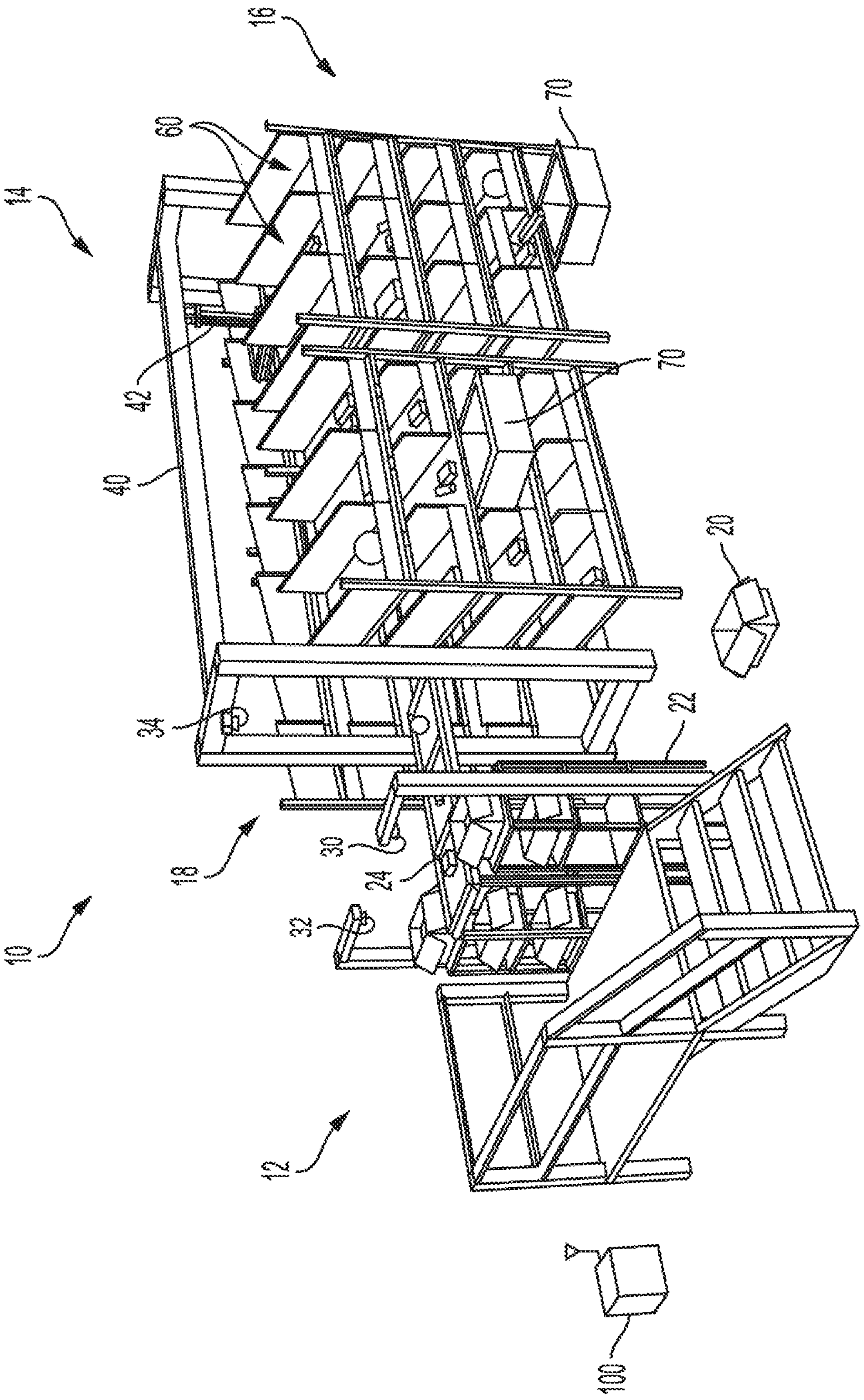
FIG. 1 shows an illustrative diagrammatic view of an operator inducted object processing system in accordance with an aspect of the present invention.

The drawings are shown for illustrative purposes only.

DETAILED DESCRIPTION

The invention provides an efficient and economical object processing system that may be used, for example, to provide any of shipping orders from a wide variety of objects, groupings of objects for shipping purposes to a variety of locations, and locally specific groupings of objects for collection and shipment to a large location with locally specific areas such as product aisles in a retail store. Each of the systems may be designed to meet Key Performance Indicators (KPIs), while satisfying industrial and system safety standards.

In accordance with an aspect, the system provides a Robotic Put Wall (RPW) that is designed to enable fast, accurate sortation of retail items, or eaches, from a tote of mixed inventory into an array of sort locations, each containing one customer order. The RPW is comprised, in accordance with an aspect, of four major components: an operator induction station, a 2D gantry with carrier, inclined shelving, and a pack-to-light interface.

The operator induction station may include a human operator station located at one end of the system. The operator receives a stream of heterogeneous totes of mixed objects (e.g., items, products, goods etc.) that collectively contain the material for a large number of customer orders. The operator is responsible for picking up each item, using a scanner to identify the item to the system via UPC, and then placing the item onto the 2D gantry carrier.

The 2D gantry carrier may include an X-Z gantry with a carrier that receives objects from the operator and transports them to any of a large number of order sortation points. The gantry is a 2-axis gantry. At the gantry tool-tip is the carrier, which is a small, belted conveyor section oriented to move items in the Y axis in accordance with an aspect. When the carrier has arrived at the X-Z address of a particular sort location, the conveyor section actuates to move the item into the shelf location on one or the other side of the gantry. This object movement happens at high enough speeds to ensure that the object does not fall between the carrier and the shelving, and that the inertia of the object carries it to the outside of the sort location (away from the carrier).

The inclined shelving may support, for example, sorting to up to 240 different destinations in accordance with an aspect. Various systems may provide varying requirements for order count stockkeeping unit (SKU) size, and physical order volume that drive the need for reconfigurability in the shelving locations. Shelving units (or modules) include the shelving on either side of the gantry, and modules can be configured with a varying number of shelves. Each shelf for example, may be divided into thirds with vertical dividers to keep orders separated. Shelves can be installed on vertical increments with, for example, a minimum pitch of 6" and maximum pitch of 18". A complete system can include a variety of number of modules.

The pack-to-light interface may provide communication between the system and human operators. As objects accumulate in the order sort locations, eventually orders will become complete and need to be removed from the sort locations by a human operator. The pack to light interface on the outside of the system serves to notify the operator via an illuminated button that an order is complete and ready to be removed and packaged. The operator also uses the same button to inform the system that the order has been removed and the sort location is clear. Lastly, an alphanumeric interface can provide additional information to the operator such as the count of objects to be removed or details related to merging multiple locations together into one large order.

FIG. 1 for example, shows an operator inducted object processing system 10 in accordance with an aspect of the present invention that includes an object induction station 12, an object processing system 14, and two object collection stations 16, 18 that are provided as a pair of arrays of destination locations 60. During use, an operator may stand on the platform, and access boxes 20 that are positioned on supports 22 proximate the operator. Objects may be removed from the boxes 20 and loaded one at a time onto a conveyor 24. One or more perception units 30, 32 may identify unique indicia on each object as it is lifted and placed onto the conveyor 24, which may optionally include cleats 25 as discussed below. A further perception system 34 above the conveyor 24 may also be used to verify the identity (and singularlity) of the selected object. In further aspects, the operator may scan each object individually with a hand-held scanner. In any event, the operator load station 12 is the place where the human operator selects and scans items for induction into the system.

Figure 21:
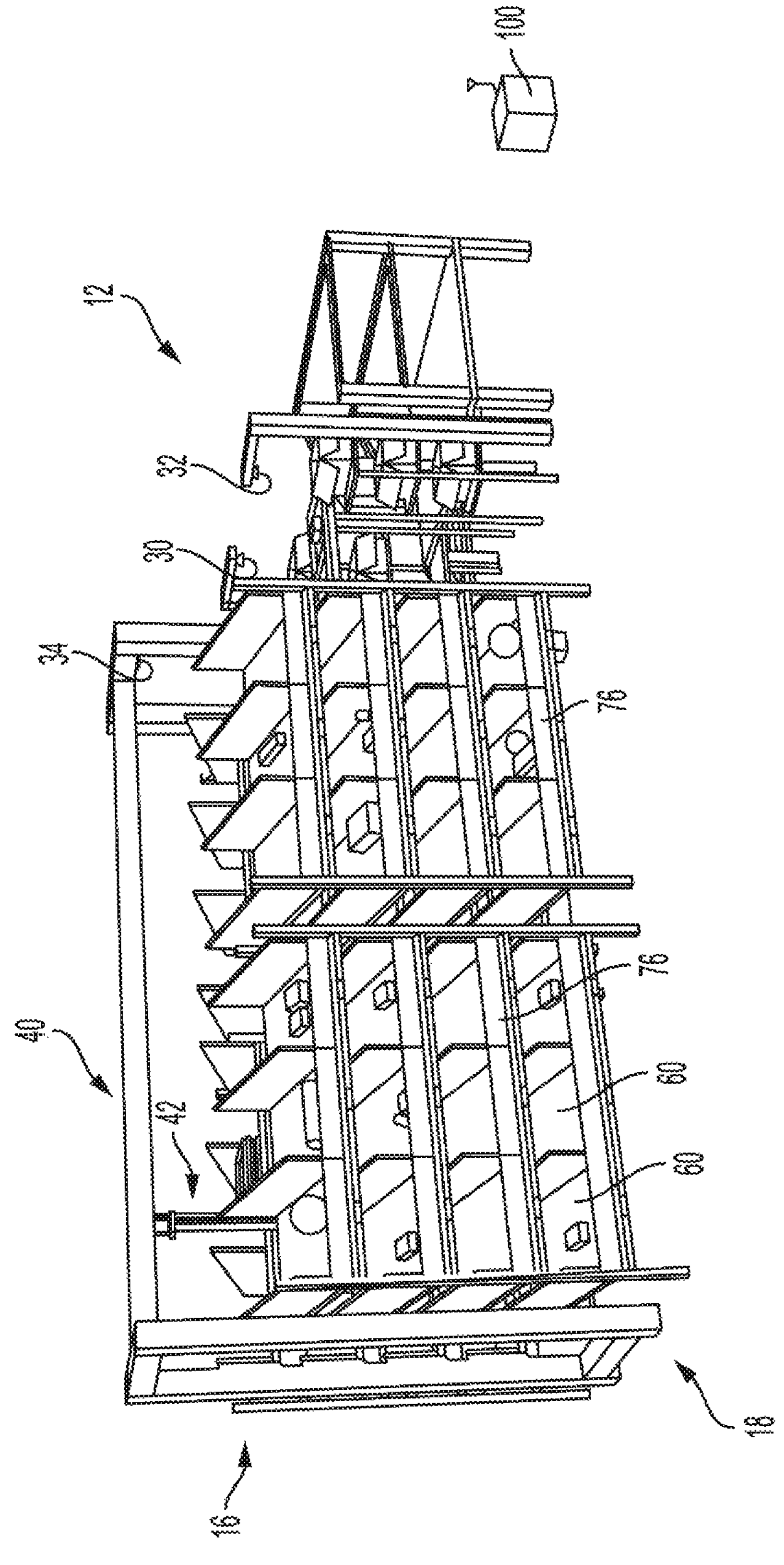
FIG. 21 shows an illustrative diagrammatic rear view of the operator inducted object processing system of FIG. 1.

The station 12 may include provisions for getting full totes to the operator, as well as taking empty totes away (for example, as shown in FIG. 21). There may also be provisions for further perception units such as barcode scanners, either fixed, handheld, or both. There may also be provisions for mounting a touchscreen display or other HMI at the station 12. The station 12 may be located such that an operator can stand ergonomically, and can place items to the carrier. From the conveyor 24, objects are moved by a gantry mounted carrier of the object processing system 14 to bring each object serially to one of the plurality of destination locations as discussed in more detail below.

Safety is a significant design aspect of the operator load station. One way to increase safety is with a conveyor that is long enough to separate the operator from carrier, which is heavy and moving at high speeds. This has the disadvantage of not allowing the operator to place items directly to the carrier, which might mean having to reduce overall item size specs due to need to accommodate for tumbling of items from transfer conveyor to carrier in certain applications.

Another way to increase safety is with light curtains, beam breaks, safety rated encoders on the gantry, etc. In accordance with this, the carrier may slow to a safe speed while within reach of the operator, and then stop if the operator breaks a light curtain, etc. A further way to increase safety is to use a mechanically interlocked door that only opens when the carrier is in position and is locked otherwise. A goal may be to achieve a less than one second operator cycle time. This is defined as the time between the carrier arriving at the load position and the time at which it is loaded and ready to move away. Operational control of the system is provided by one or more computer control systems 100 that communicate (wired or wirelessly) to the conveyors, perception units, gantry, carrier and input/output devices of the system.

Figure 2A:
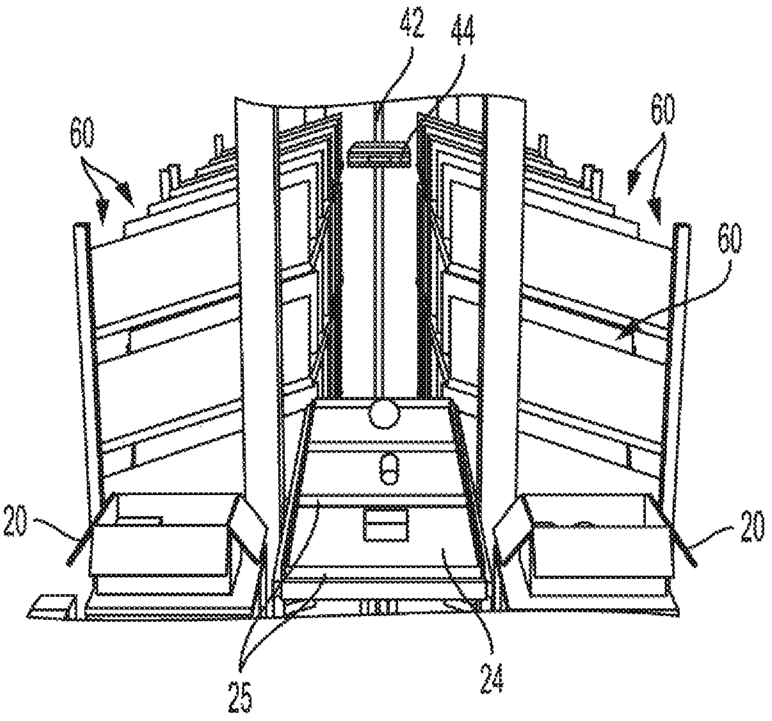
FIGS. 2A-2D show enlarged illustrative diagrammatic front views of the carrier of the object processing system of FIG. 1, showing the carrier approaching an input area (FIG. 2A), receiving a new object for distribution (FIG. 2B), having moved away from the input area with the object (FIG. 2C), and having carried the object to a destination location (FIG. 2D)
Figure 2B:
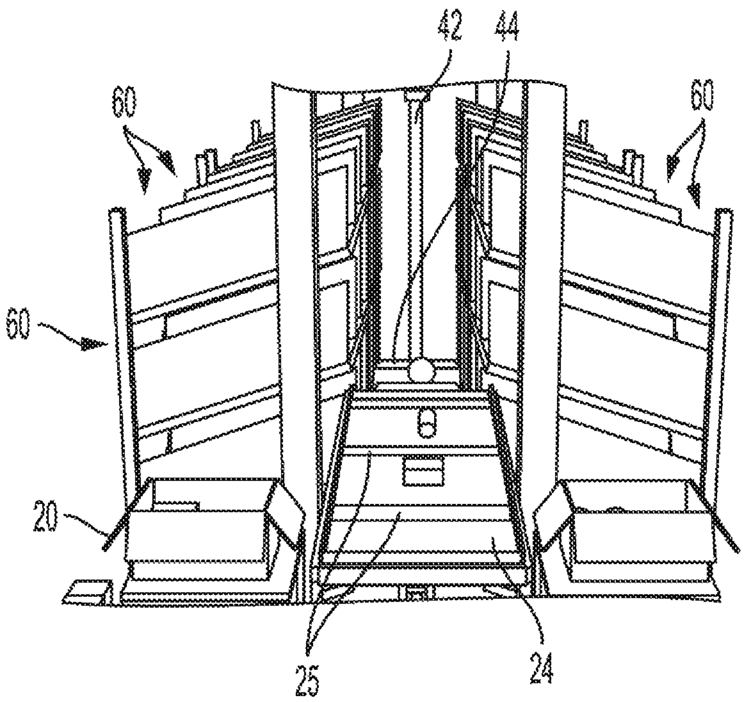
Figure 2C:
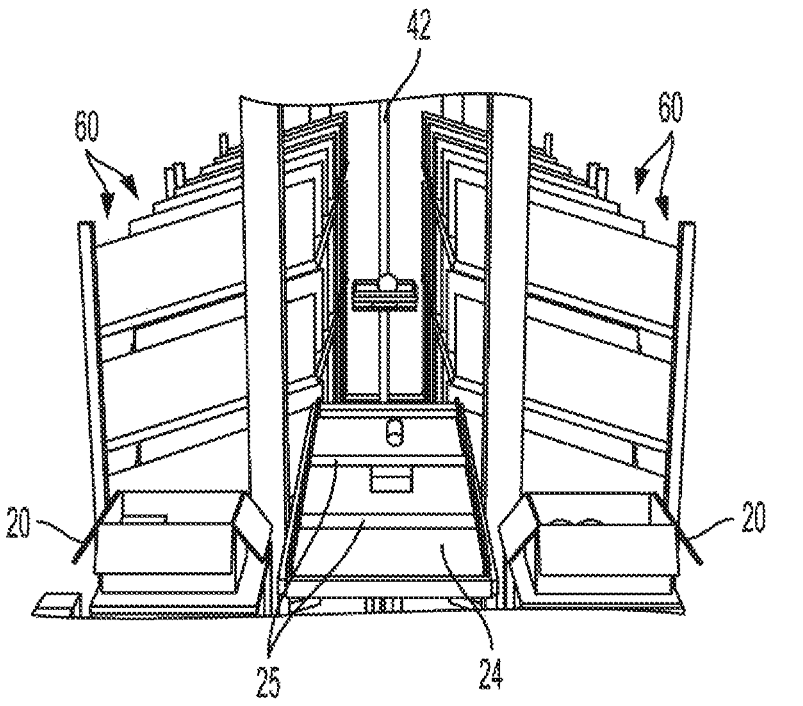
Figure 2D:
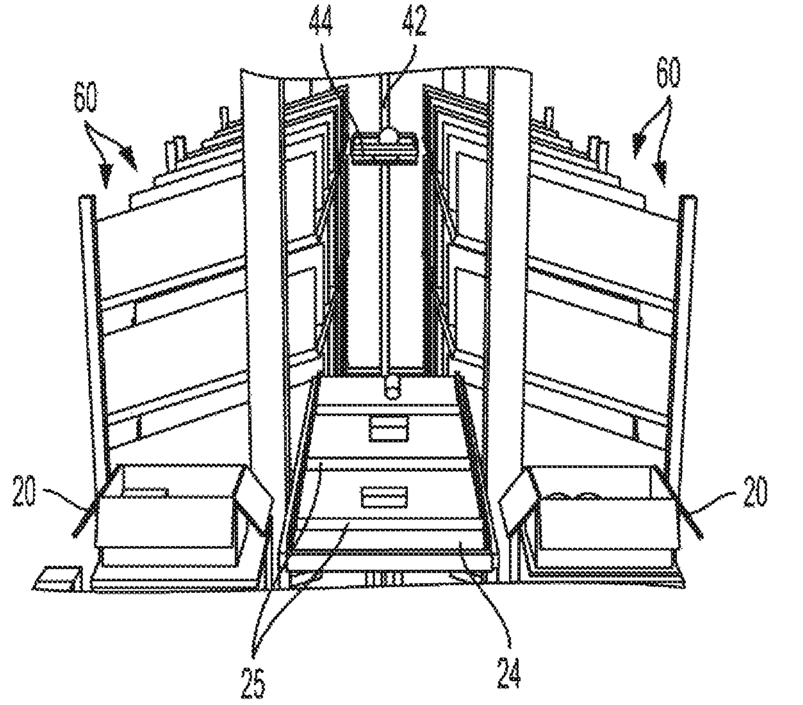

FIG. 2A shows a front view of the object processing system 14 that includes a gantry with a horizontal moving member 40 and a travelling vertical member 42 that moves with the horizontally moving member 40 as discussed further below with reference to FIGS. 10 and 11. A carrier 44 is mounted on the vertical member 42. As the conveyor 24 advances toward the system 14, the carrier 44 returns to a home position (shown in FIG. 2B) that is adjacent the conveyor 24. An object at the end of the conveyor 24 is then moved onto the carrier 44 as shown in FIG. 2B. FIG. 2C shows the carrier moving horizontally, and FIG. 2D shows the carrier moving vertically toward a selected destination location. The time required to move to and return from each destination location is known, and the speed of the conveyor is modulated such that as each loaded object on the conveyor 24 reaches the object processing system 14, the carrier 44 is positioned to receive the object from the conveyor 24. This ensures that the conveyor moves continuously, as the operator is loading objects onto the conveyor. In accordance with further aspects, the speed of movement of the conveyor 24 may further be dependent on handling parameters of an object that is currently being moved by the carrier as discussed in more detail below. The perception units 30, 32 of FIG. 1 are removed from FIGS. 2A-2D for clarity. The 2D gantry is an X-Z cartesian robot capable of moving items along the horizontal and vertical face of the machine. The frame that supports the gantry programmable motion device provides that the shelving and gantry programmable motion device including the carrier may be positioned close enough together that a gap between the carrier and each destination location may be traversed given each object's mass and the acceleration of the carrier conveyor on the carrier.

Figure 3A:
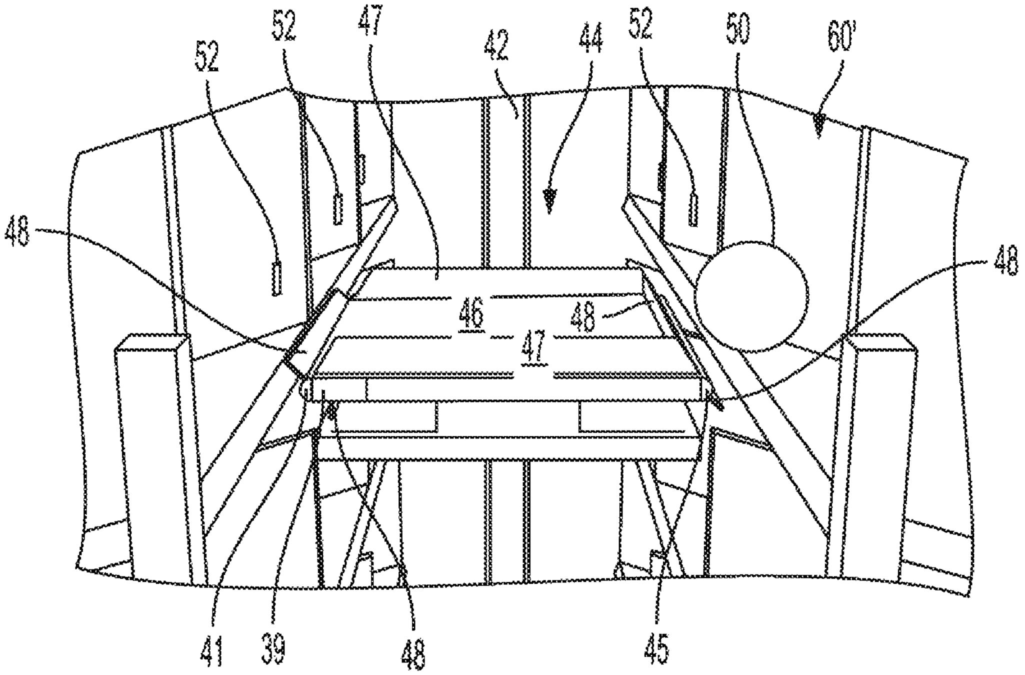
FIGS. 3A and 3B show further enlarged illustrative diagrammatic front views of the carrier discharging an object to a first side of the carrier into a destination location (FIG. 3A) and discharging the object to a second opposite side of the carrier into a different discharge location (FIG. 3B)
Figure 3B:
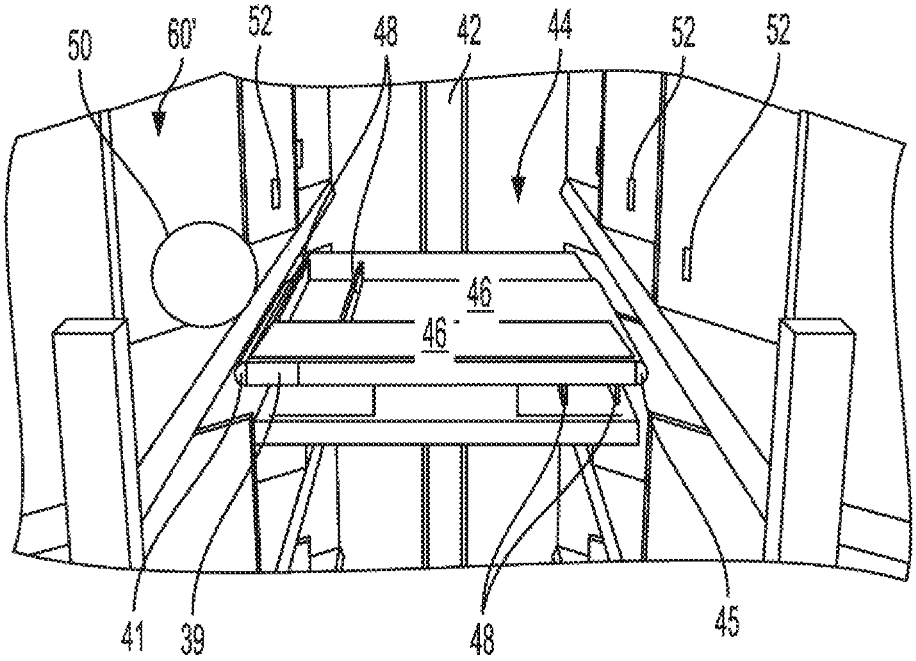

With reference to FIGS. 3A and 3B, the carrier 44 includes a conveyor 46 (optionally with cleats 48) that may be run (accelerated) in either of two opposing directions (that are generally orthogonal to the vertical and horizontal directions of the gantry 40, 42). FIG. 3A shows an object 50 being urged from the conveyor 46 to a destination location 60', and FIG. 3B shows the object 50 being urged in a direction opposite that of FIG. 3A from the conveyor 46 to a destination location 60". The conveyor 46 may be driven by a drive roller 41 powered by a motor 39 in either of opposing directions. The drive system may, for example, be configured to receive either of two instructions (for moving the conveyor 46 in either of two mutually opposing directions) one unit of movement where the unit may be, for example a full or one half revolution of the conveyor. In this way, a single command may be provided (e.g., wirelessly) that causes a clean discharge in either of the two discharge directions. Beam breaks 52 in the destination locations may also be used to identify when an object is received in a respective destination location 60.

Figure 20:
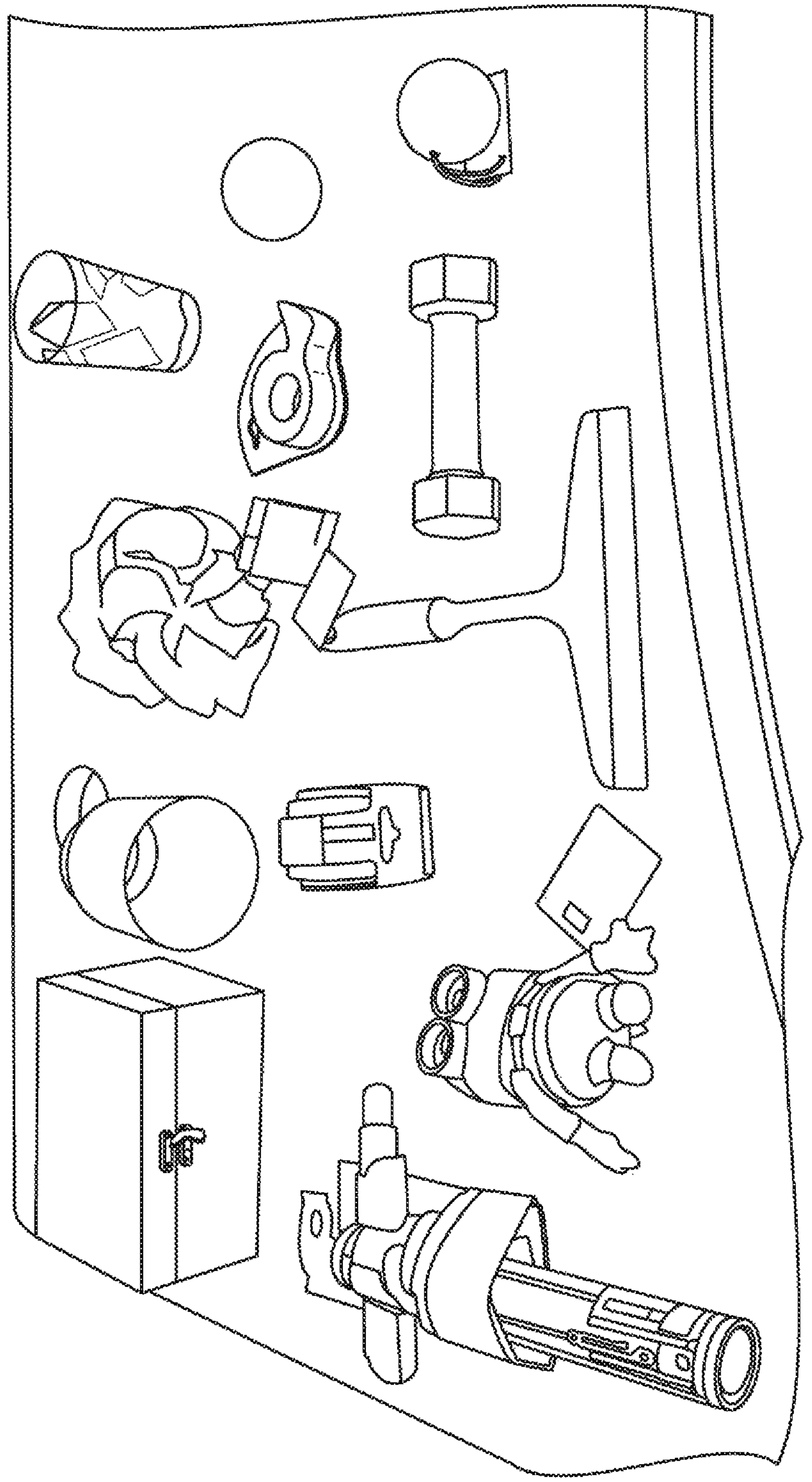
FIG. 20 shows an illustrative diagrammatic view of unpackaged irregularly-shaped objects for processing in accordance with an aspect of the present invention.

The carrier therefore rides on the distal end of the gantry robot and delivers items to each shelving unit. The operator places items onto the carrier (either indirectly via conveyor 24 or directly as shown in FIG. 20), which then is moved by the gantry to the X-Z address associated with the selected destination for the desired storage location. The carrier then actuates its conveyor in either direction (plus or minus Y) to deposit the item into one of the two storage locations available at that X-Z address. In accordance with an aspect, the belt of the conveyor may take no longer than 1s to perform a half-revolution around the bed of the carrier, and the carrier includes retaining walls 47 on both sides parallel to the axis of motion of the carrier belt. The belt of the carrier conveyor may also have some combination of flights (or cleats) to discourage items from falling off in the sides perpendicular to the direction of the motion, and possibly to assist in urging objects from the carrier conveyor.

For objects that are known to have associated handling parameters that make urging the object from the carrier conveyor over a gap and into a selected destination location impractical (for example, if the object or packaging is fragile, has low position authority, low pose authority or is too heavy such as above 5 lbs or even 8 lbs), then the system may move the object toward the selected destination location more slowly, and in certain aspects, the carrier may be configured to move the carrier conveyor itself closer to the selected destination location.

Figure 4:
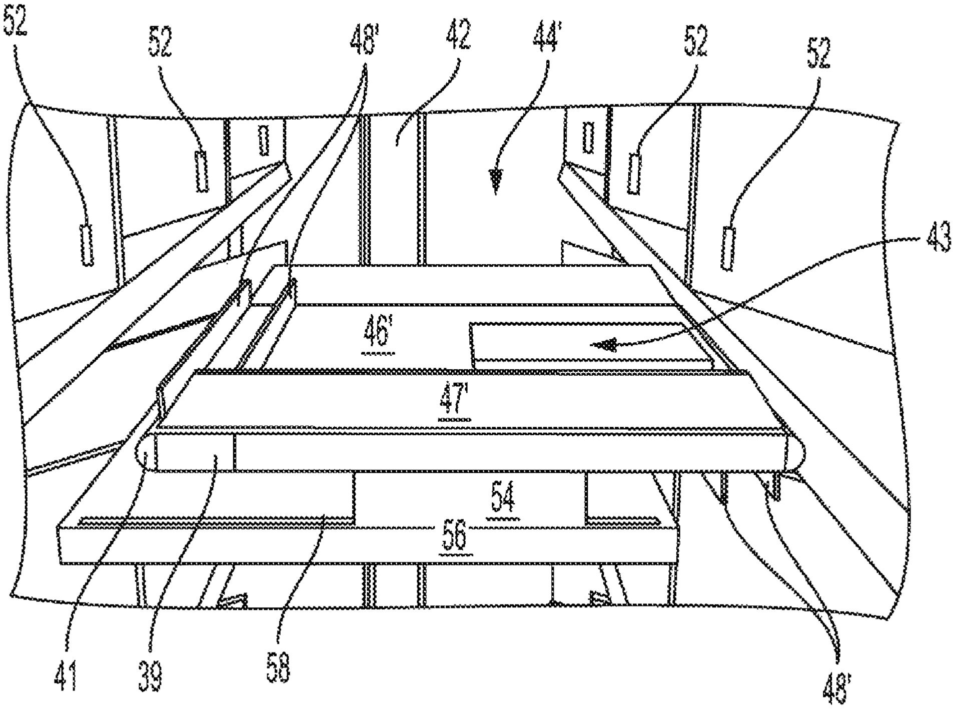
FIG. 4 shows an illustrative diagrammatic front view of a carrier in accordance with another aspect of the present invention that is mounted on a sliding actuator.
Figure 5:
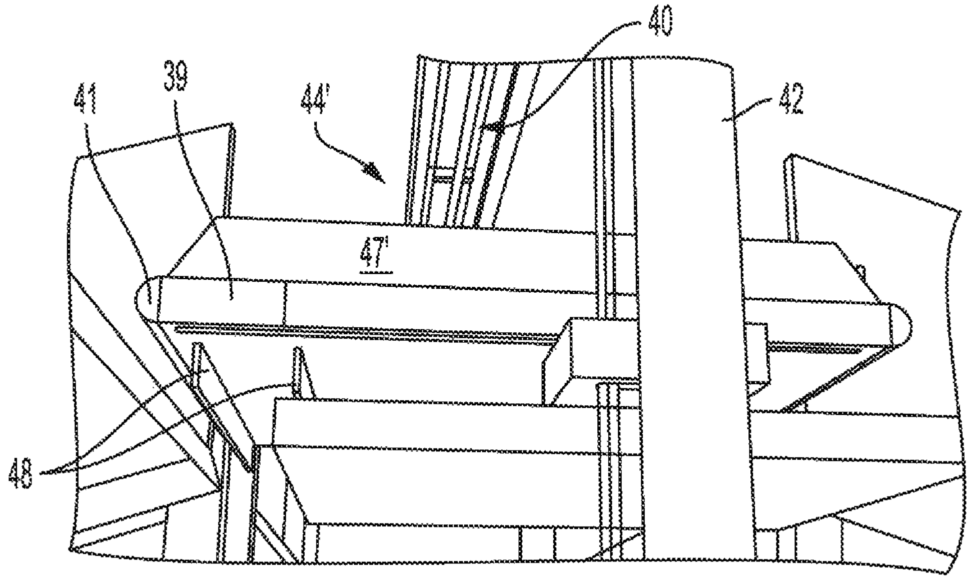
FIG. 5 shows an illustrative diagrammatic rear view of the carrier of FIG. 4.

For example, FIG. 4 shows a carrier 44' in accordance with a further aspect that includes a conveyor 46' with cleats 48' and retaining walls 47'. The conveyor 46' is mounted on a sliding actuator 53 that includes a mount 54 that is engaged by a linear motor system that runs along a track 58 on a base 56 (shown in FIG. 4). As shown in FIGS. 4 and 5, the carrier 44' may be moved toward a selected destination location such that an object 43 on the carrier that may be known to have special handling instructions may be moved to the selected destination location 60' more gently and with more control of the object's movement.

Figure 9:
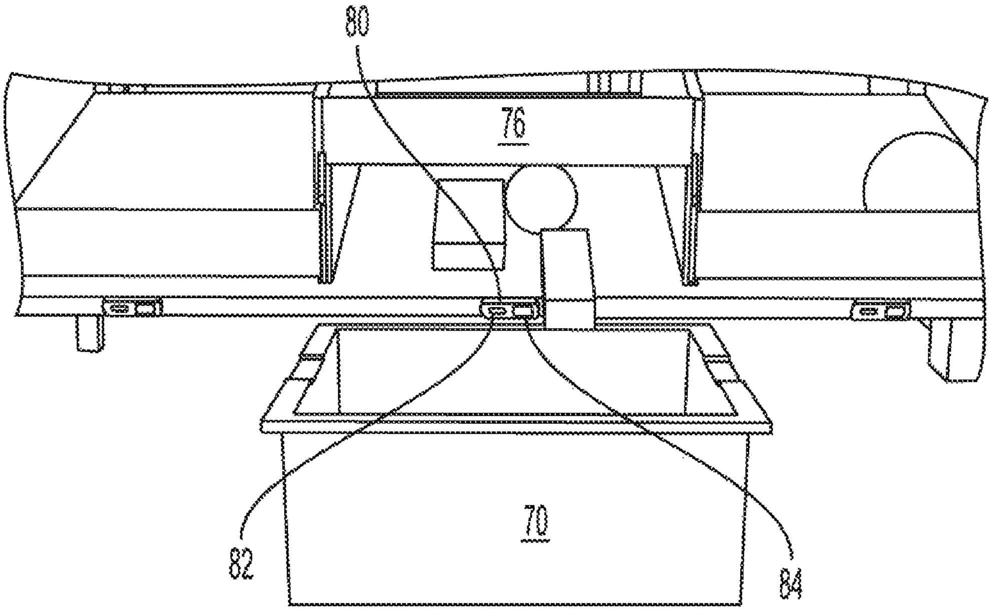
FIG. 9 shows an illustrative side elevational view of a shelf opening leading to a container that is positioned in the ground in accordance with an aspect of the present invention.

The shelving of the arrays of destination locations 16, 18 may include inclined shelves or chutes and may be designed to interface with the gantry frame and objects moved from the carrier. The shelving may be inclined to encourage gravity flow of deposited items toward the packout side of the shelves. An operator may position a bin, tote, or box at the exposed side of each of the shelves, for loading objects on a shelf into the container (e.g., bin, tote or box). If the shelf is on the lowest level, the container may be placed on the ground as shown in FIG. 9. For higher shelves, braces 74 may be used (as shown in FIG. 7) against which a bottom of the container may be positioned to either facilitate an operator holding the container, and if properly sized, to permit the top of the container to wedge under an upper shelf (as shown at 72) to hold the container in position (optionally with ready support by the operator. The operator may then be free to open a retaining guard 76 as shown in FIG. 6.

The retaining guard 76 may be provided at the front of the shelf to keep objects in, but not unduly block access for removing items. The retaining guard 76 may include a vertically slidable wall (as shown in FIG. 6) or an elastic strap (as shown at 76' in FIG. 8) across the front face of each shelf opening that will restrain items but is easily held out of the way to access items inside the shelves.

Figure 6:
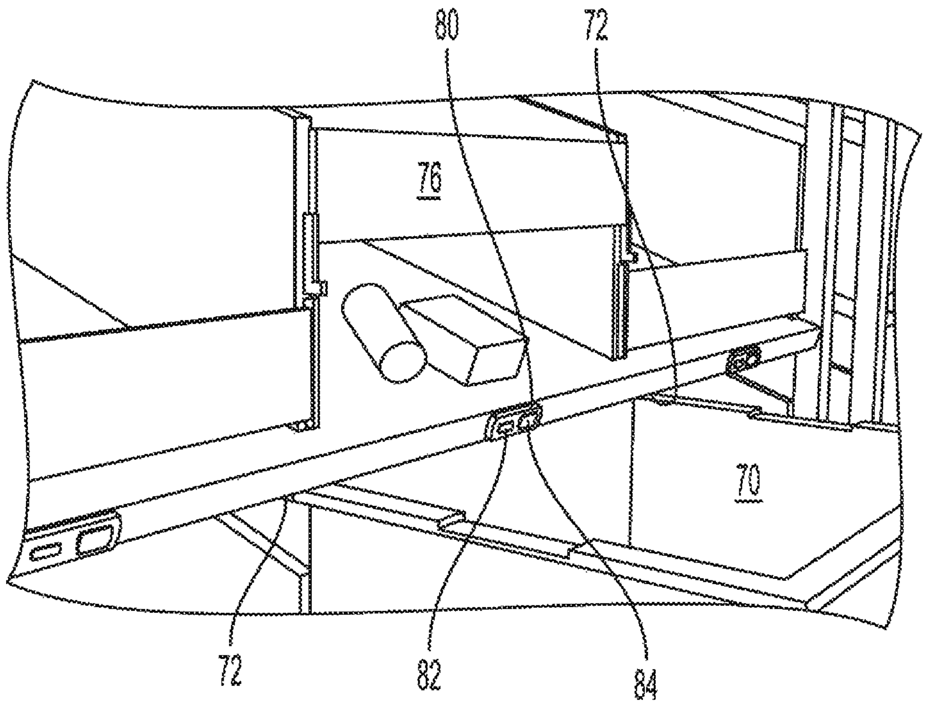
FIG. 6 shows an illustrative diagrammatic view of a shelf opening with a vertically slidable wall in accordance with an aspect of the present invention.
Figure 7:
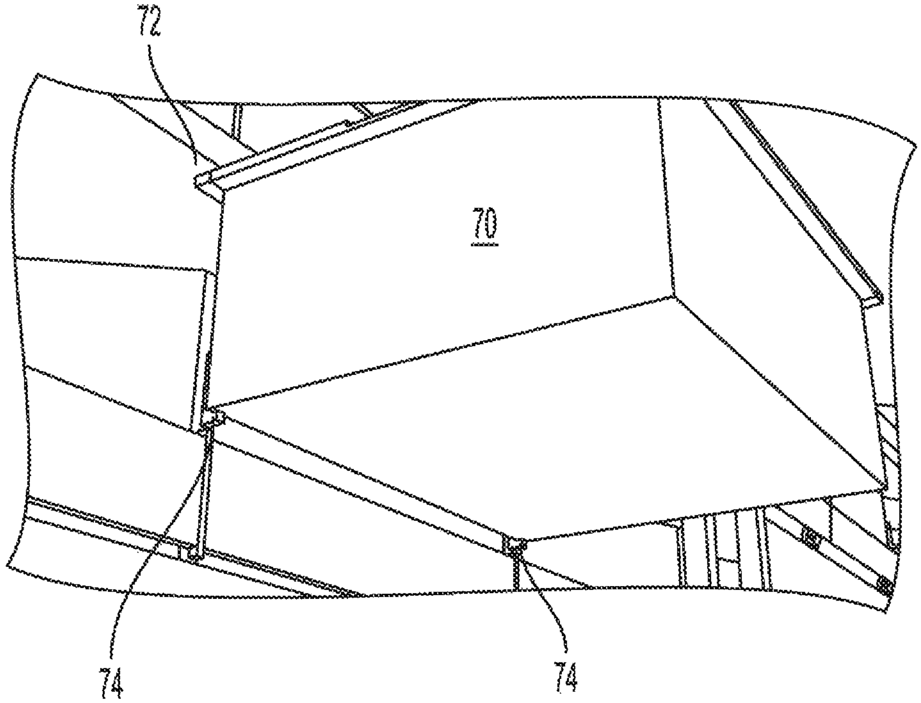
FIG. 7 shows an illustrative diagrammatic underside view of a container positioned at an elevated shelf opening using braces in accordance with an aspect of the present invention.
Figure 8:
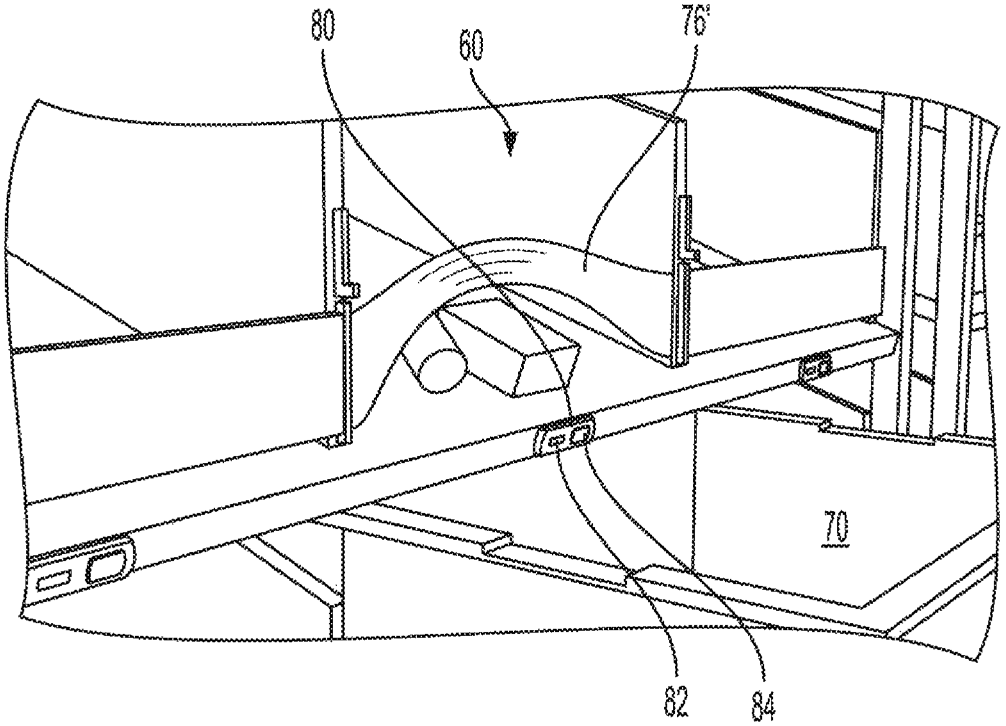
FIG. 8 shows an illustrative diagrammatic view of a shelf opening with a vertically slidable wall in accordance with an aspect of the present invention.

As also shown in FIGS. 6-8 and as further shown in FIG. 9, each destination location may include a pack-to-light interface 80. Each shelf may therefore include a button and light for each storage location within the shelf to allow for indicating by a lighted button 84 a ready state to the operator and for the operator to provide feedback to the system an order is being removed. In addition, a basic display 72, such as 7-segment display may be provided for conveying additional information to operators such as merging sort locations containing the items for a single large order (as shown in FIGS. 6 and 8 in particular). These should be readily accessible from the outside (operator side).

Figure 10:
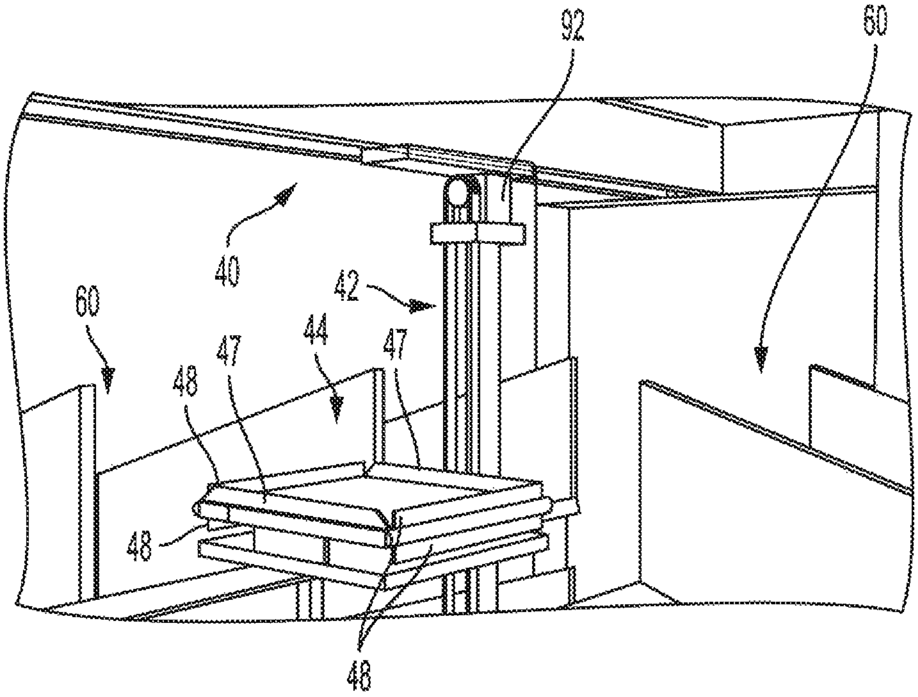
FIG. 10 shows an illustrative diagrammatic view of a vertical carrier positioning system of the system of FIG. 1.
Figure 11:
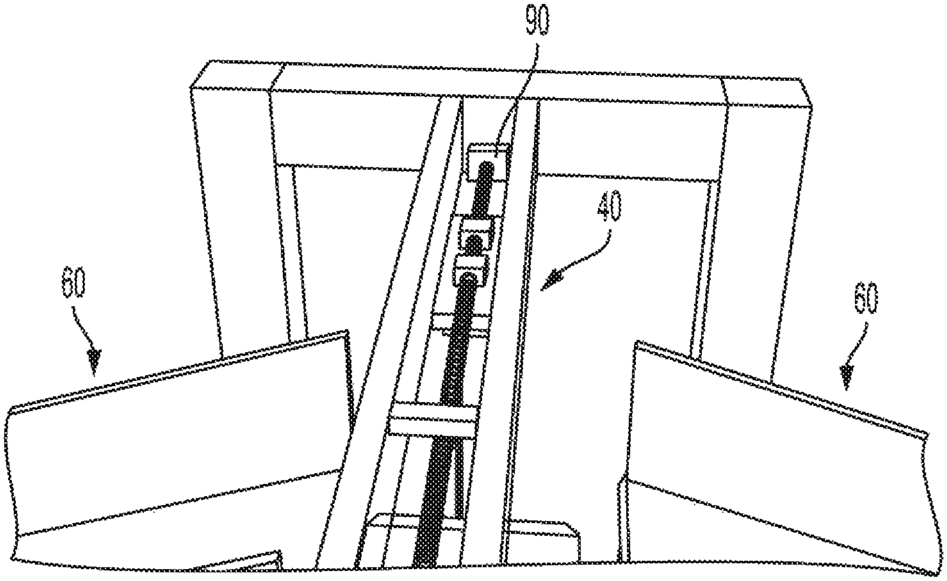
FIG. 11 shows an illustrative diagrammatic view of a horizontal carrier positioning system of the system of FIG. 1.

With reference to FIG. 10, the vertical moving member 42 may include vertical drive system with a chain or belt that is drive around a drive roll by a vertical drive motor 92, with a portion of the chain or belt attached to the carrier 44 frame. With reference to FIG. 11, the horizontal moving member may include horizontal drive system with a linear gear that is driven by a horizontal drive motor 90, with the vertical moving member end attached to one or more following nuts that are moved along a threaded shaft as the motor 90 rotates the shaft. A pair of vertical drive systems may be used (one at the top and one at the bottom), and a pair of horizontal drive systems may be used (again, one at the top and one at the bottom). The use of the independent drive systems permits the carrier to me freely moved in the X-Z plan between the arrays of destination locations. As movement directions may include simultaneous X and Z components, and the movements of the vertical and horizontal drive systems are independent of one another. Advantageously, the vertical drive system and the horizontal drive system each include motors and gearing that are supported by the put-wall frame, and are not on the carrier 44.

Again, the system may include one or more computer systems that communicate (via wired or wireless communication) with the conveyors, perception units, gantry, carrier and input/output devices of the system. A manifest file is transferred to the system that includes a list of objects in their order groupings. Manifest orders are assigned storage locations based on item quantity. Some orders may need multiple storage locations to hold them. The system may provide order allocation decisions. The output lights may indicate storage locations that have been assigned orders from a particular manifest.

Figure 12:
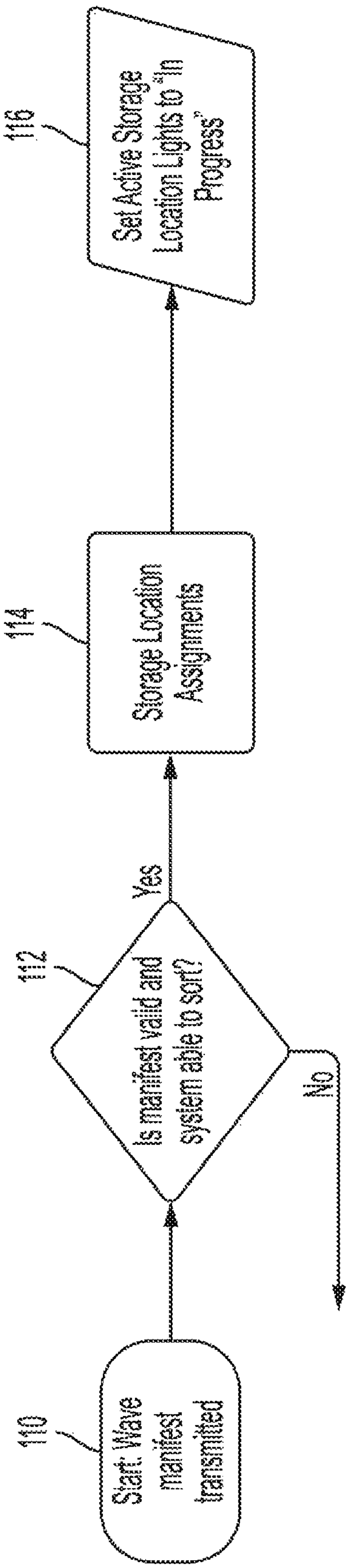
FIG. 12 shows an illustrative diagrammatic view of the process flow of a storage location assignment system in accordance with an aspect of the present invention.

With reference to FIG. 12 therefore, the system begins with a wave manifest being transmitted (step 110), and if the manifest is valid and the system is able to sort the objects (step 112), the system continues (otherwise it ends). The system continues by assigning destination (storage) locations (step 114) and then setting active destination location lights to an in process mode of illumination (step 116).

Figure 13:
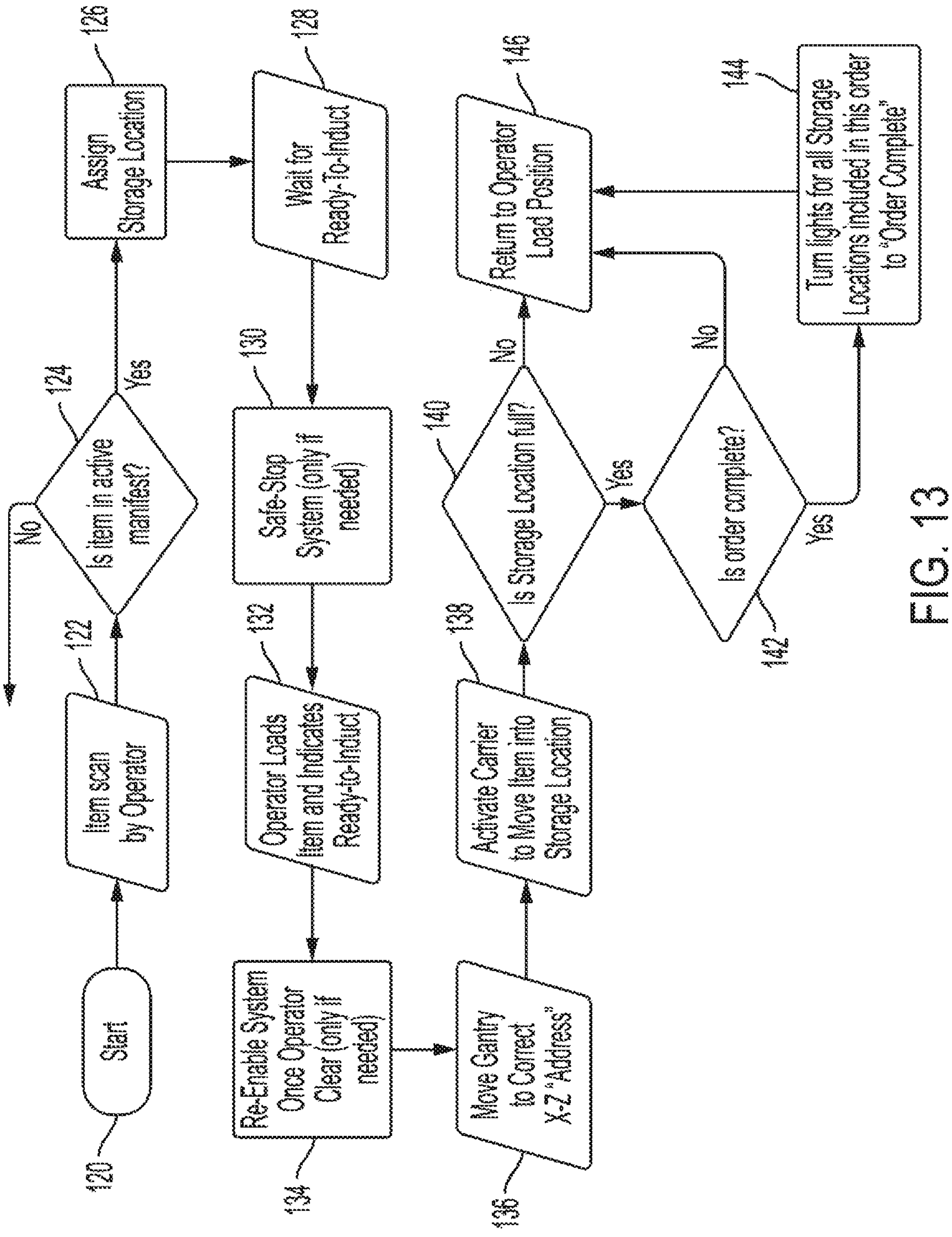
FIG. 13 shows an illustrative diagrammatic view of the process flow of a picking process in an induction system in accordance with an aspect of the present invention.

With further reference to FIG. 13, the picking and induction begins (step 120) and objects are then scanned by the operator (step 122). If the object is in current manifest (step 124) then the correct storage location will be assigned (step 126). If multiple storage locations are waiting for this item (step 128), preference is given to the order that is closest to complete. A safe-stop check is then performed (step 130). The operator places item on carrier (or on intermediate conveyor, or through door, as determined by Operator Load Station safety design) (step 132), and then may optionally use a button or other means to indicate that the item is ready to be inducted (step 134). The carrier then moves item to a position adjacent a selected destination location (step 136), and the carrier is activated to move the object into the selected destination location (step 138).

The system then determines whether the destination location is full (step 140), and if not, the carrier returns to the Operator Load Position (step 146). If the storage location is full (step 140), the system determines whether the Order is complete (step 142). If not, the carrier returns to the Operator Load Position (step 146), and if the Order is complete, then the Storage Location light is turned to green (step 144). If the Order includes multiple Storage Locations, then all Storage Location lights for that Order should all be turned to green only when the last Storage Location is full. The Carrier will then return to the load position (step 146).

Figure 14:
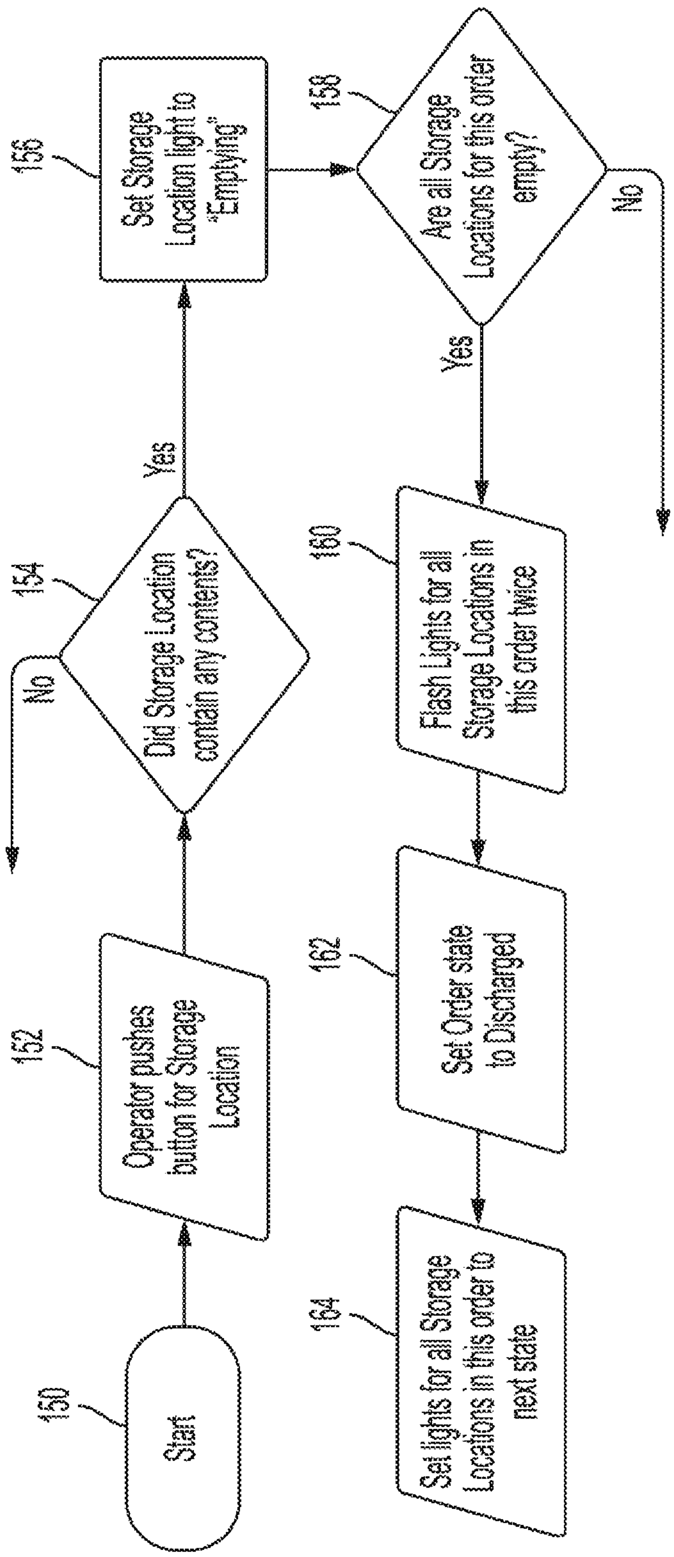
FIG. 14 shows an illustrative diagrammatic view of the process flow of a storage location processing system in accordance with an aspect of the present invention.

When a Storage Location light is green, it is ready to be emptied. With reference to FIG. 14, the system then begins (step 150) and an operator will retrieve all items from a Storage Location, then press the selector button (e.g., 84) for that location (step 152). If the storage location included objects (step 154), the status is changed to emptying (step 156). The system will then determine whether all storage locations for this order have been emptied (step 158). If not, the system repeats the above until all storage locations for this order are emptied, and the system then indicates each storage location that is ready for discharge (step 160). The order state is set to discharged (step 162), and the indicator lights for all storage locations for this order are set to the next state (step 164).

Figure 15A:
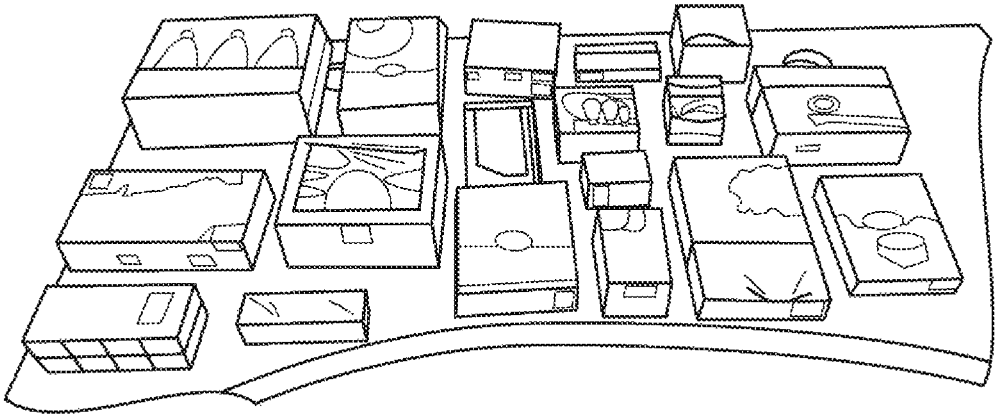
FIGS. 15A and 15B show illustrative diagrammatic views of box-shaped objects for processing in accordance with an aspect of the present invention, showing front views of the objects (FIG. 15A) and rear views of the objects (FIG. 15B)
Figure 15B:
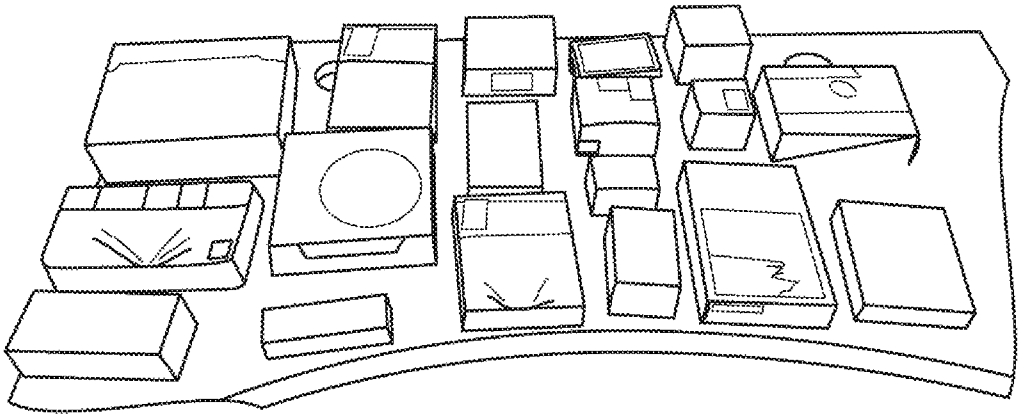
Figure 16A:
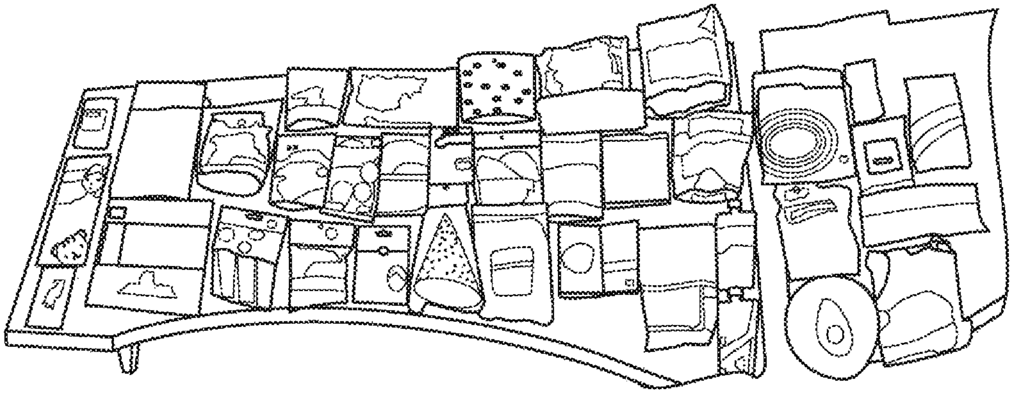
FIGS. 16A and 16B show illustrative diagrammatic views of non-rigid bag or pouch shaped objects for processing in accordance with an aspect of the present invention, showing front views of the objects (FIG. 16A) and rear views of the objects (FIG. 16B)
Figure 16B:
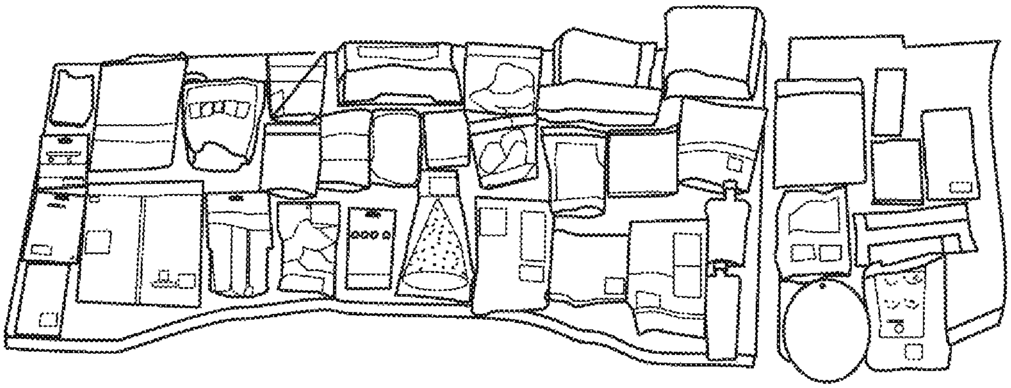
Figure 17:
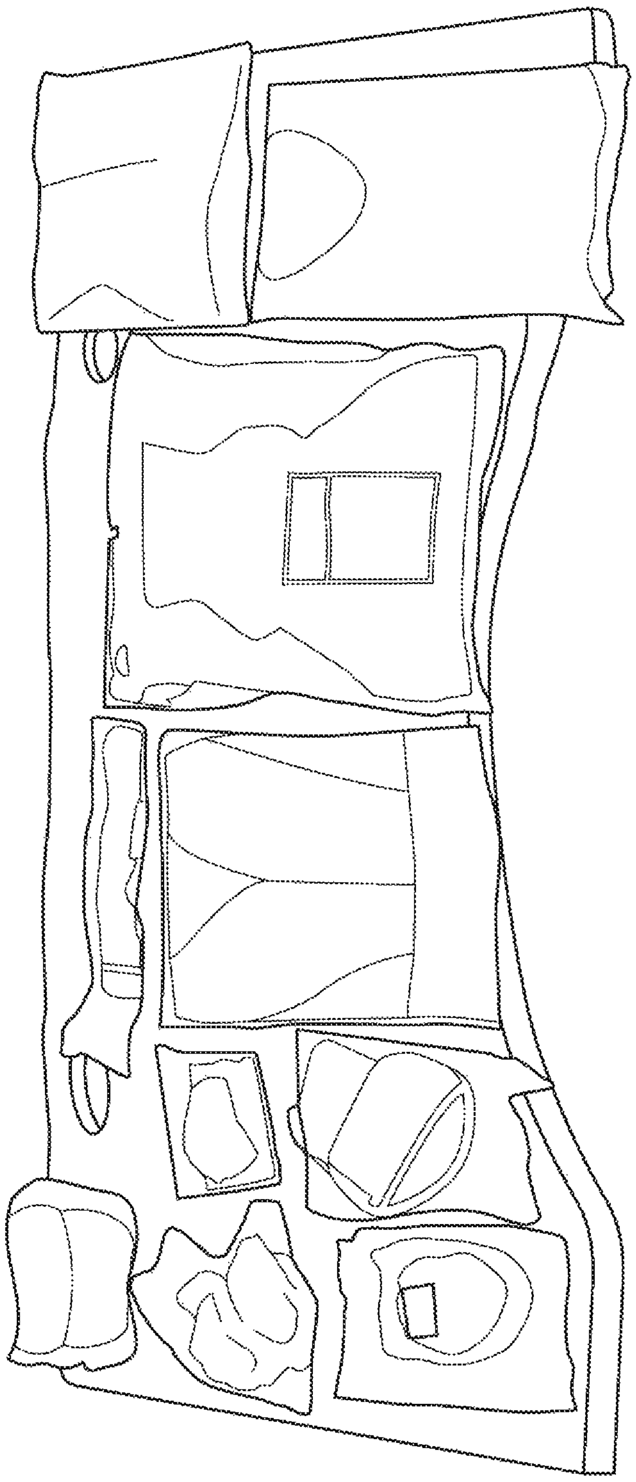
FIG. 17 shows illustrative diagrammatic views of objects in non-rigid shipping bags for processing in accordance with an aspect of the present invention.
Figure 18A:
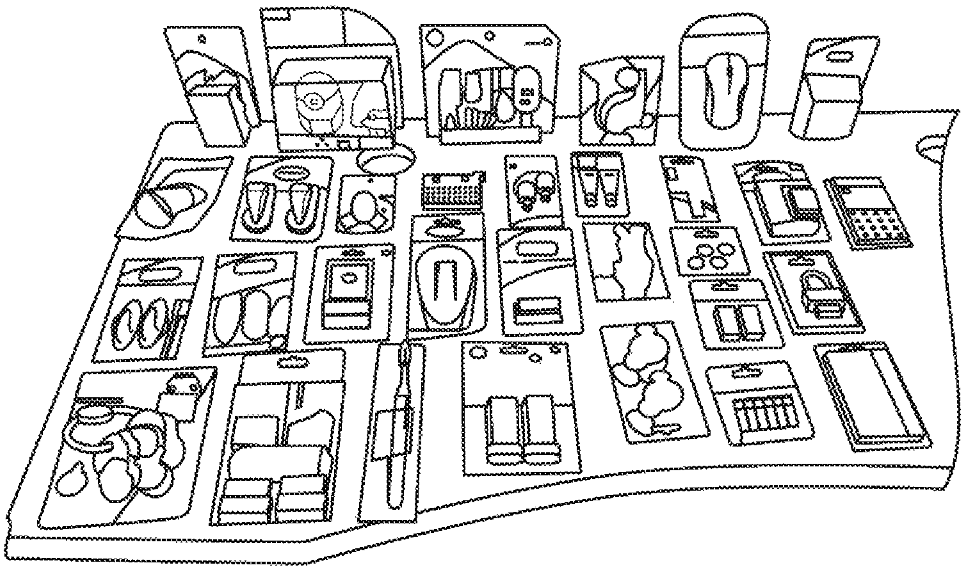
FIGS. 18A and 18B show illustrative diagrammatic views of clam shell-shaped objects for processing in accordance with an aspect of the present invention, showing front views of the objects (FIG. 18A) and rear views of the objects (FIG. 18B)
Figure 18B:
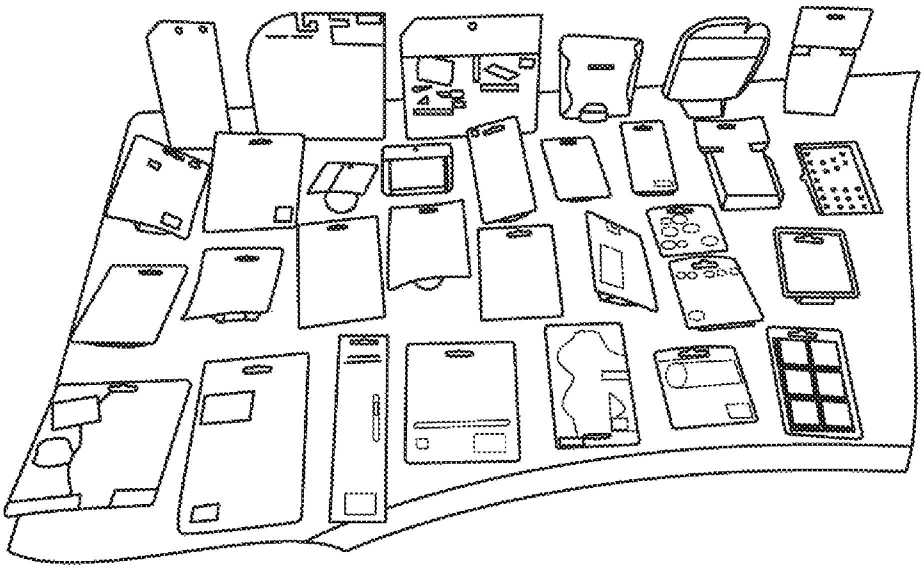
Figure 19A:
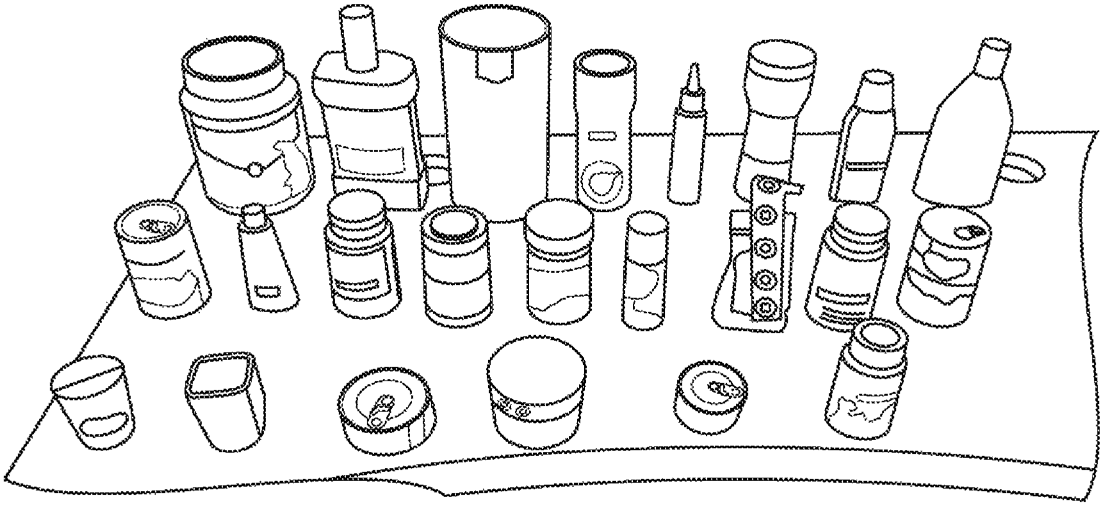
FIGS. 19A and 19B show illustrative diagrammatic views of cylinder-shaped objects for processing in accordance with an aspect of the present invention, showing front views of the objects (FIG. 19A) and rear views of the objects (FIG. 19B)
Figure 19B:
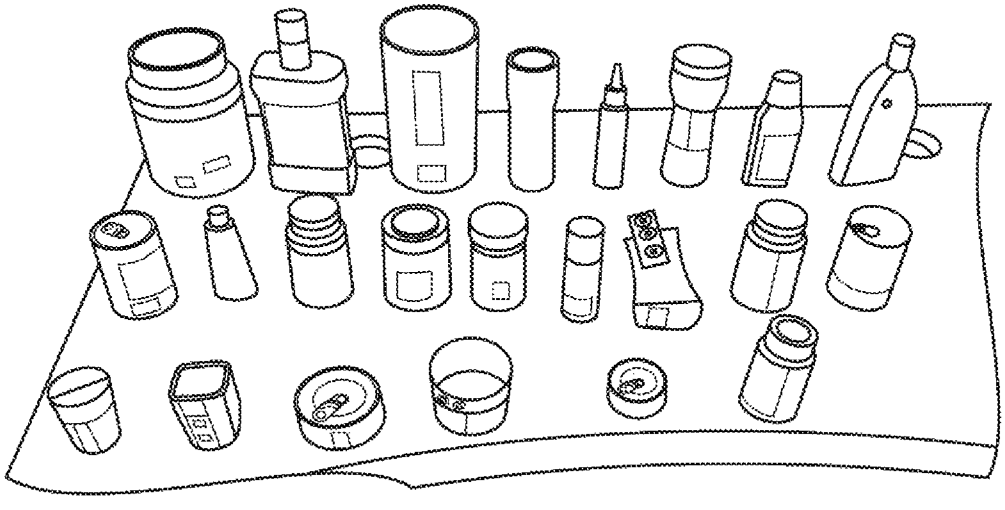

Suitable objects for processing may be, for example, 1 oz to 10 lbs, and may include rigid rectangular prisms, polybags with soft contents, including apparel in light polybags, polybags with rigid contents, including small objects in large polybags, bubble mailer envelopes, blister packs, clamshells, cylinders, liquid bottles, pill bottles, shipping tubes and cosmetic pencils. FIGS. 15A, 15B show front and back sides of box shaped objects in examples of major categories of acceptable objects. FIGS. 16A, 16B show front and back sides of bag/pouch shaped objects in examples of major categories of acceptable objects. FIG. 17 shows examples of polybag objects in examples of major categories of acceptable objects. FIGS. 18A, 18B show front and back sides of clamshell shaped objects in examples of major categories of acceptable objects. FIGS. 19A, 19B show front and back sides of cylinder-shaped objects in examples of major categories of acceptable objects. FIG. 20 shows unpackaged objects as examples of objects that may be processed. FIG. 21 shows a view of the back side of the system of FIG. 1 showing the array 18 of destination locations 60 for receiving objects as retained by moveable retaining members 76.

Figure 22:
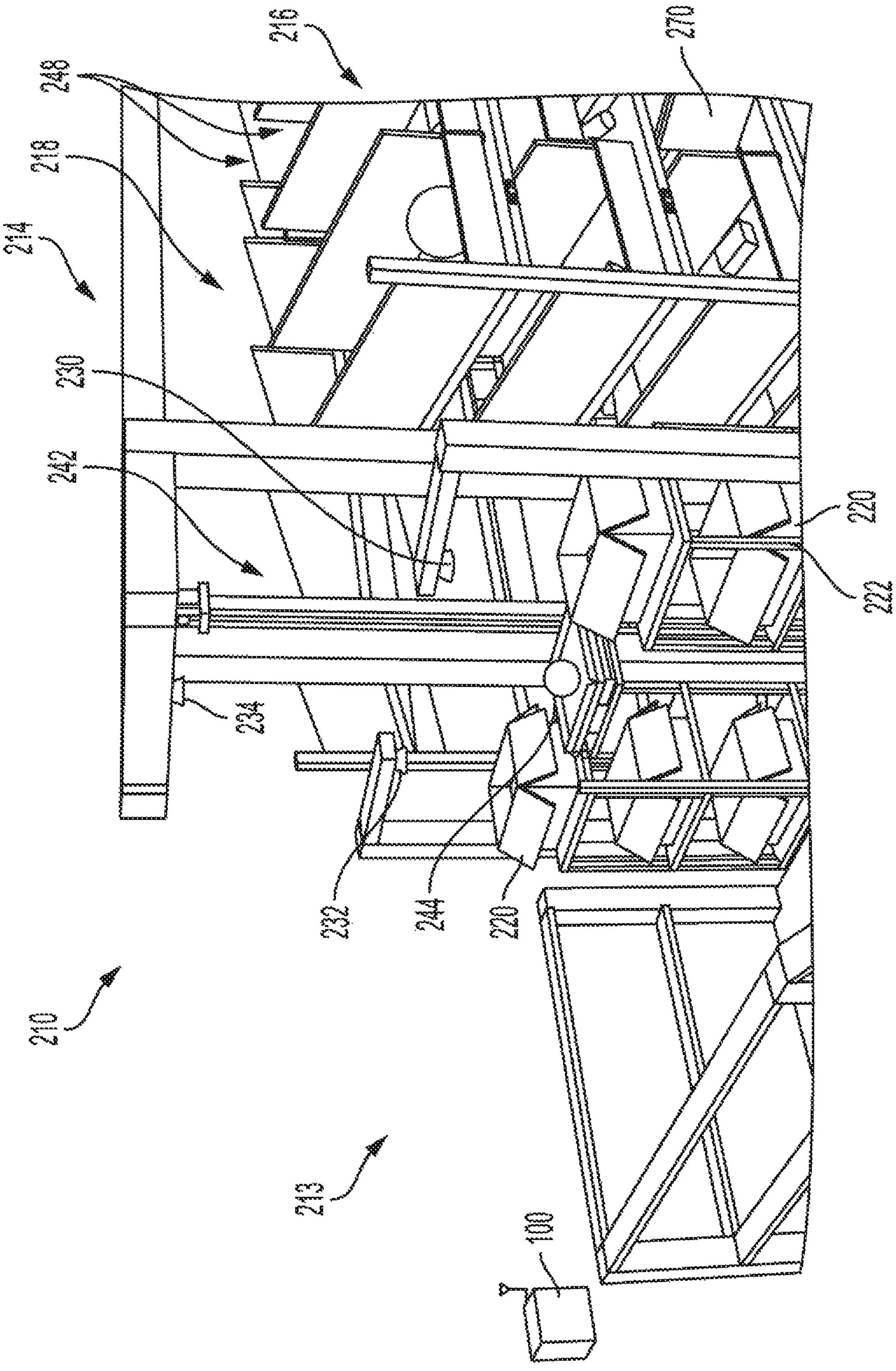
FIG. 22 shows an enlarged front view of an operator inducted object processing system in accordance with another aspect of the present invention that includes a directly loadable carrier.

FIG. 22 shows an operator inducted object processing system 210 in accordance with another aspect of the present invention that includes an object induction station 212, an object processing system 214, and two object collection stations 216, 218 that are provided as a pair of arrays of destination locations 260. During use, an operator may stand on the platform, and from boxes 220 that are positioned on supports 222 proximate the operator, objects may be removed from the boxes 220 and loaded one at a time directly onto a carrier 244. One or more perception units 230, 232 may identify unique indicia on each object as it is lifted and placed onto the carrier 244. A further perception system 234 above the carrier 244 may also be used to verify the identity of the selected object. In further aspects, the operator may scan each object individually with a hand-held scanner. In any event, the operator load station 212 is the place where the human operator selects and scans items for induction into the system.

The station 212 may include provision for getting full totes to the operator, as well as taking empty totes away (for example, as shown in FIG. 20). There may also be provisions for further perception units such as barcode scanners, either fixed, handheld, or both. There may further be provisions for mounting a touchscreen display or other HMI at the station 212. The station 212 may be located such that an operator can stand ergonomically, and can place items to the carrier. Once on the carrier 244, objects are moved by a gantry 240 of the object processing system 214 to bring each object serially to one of the plurality of destination locations 260 as discussed in more detail above with reference to FIGS. 1-12.

Similar to the systems discussed above, the gantry 240 includes a travelling vertical member 242 that moves horizontally along the gantry 240. The carrier 244 is mounted on the vertical member 242. The carrier 244 returns to a home position, receives an on object, and is then moved horizontally and vertically to a selected destination location, which may be emptied into containers 70 (e.g., bins, totes or boxes) as discussed above with reference to FIGS. 1-12. Operational control of the system is provided by one or more computer control systems 200 that communicate (wired or wirelessly) to the conveyors, perception units, gantry, carrier and input/output devices of the system.

Figure 23:
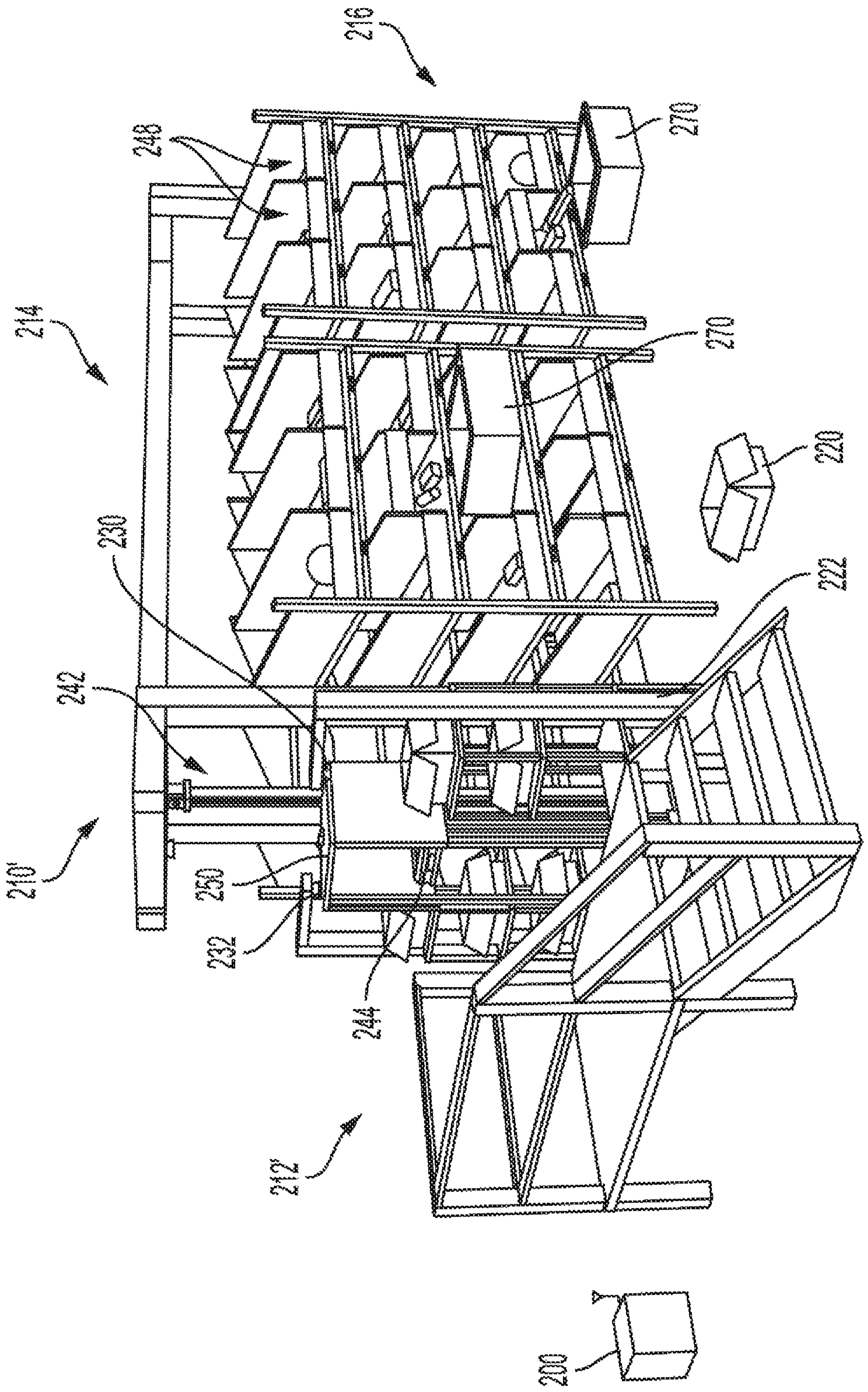
FIG. 23 shows an illustrative diagrammatic view of an operator inducted object processing system that includes a semi-enclosed carrier loading area in which the carrier is presented at the input area in accordance with an aspect of the present invention.

FIG. 23 shows an operator inducted object processing system 210' in accordance with another aspect of the present invention that includes an object induction station 212', as well as an object processing system 214, and two object collection stations 216, 218 that are provided as a pair of arrays of destination locations 240 as discussed above. Similarly, during use, an operator may stand on the platform, and from boxes 220 that are positioned on supports 222 proximate the operator, objects may be removed from the boxes 220 and loaded one at a time directly onto a carrier 244. The object induction station 212' includes semi-enclosed area 250 that receives the carrier 244, on which an object may be loaded for delivery to any of the destination locations 240 as discussed above.

Figure 24A:
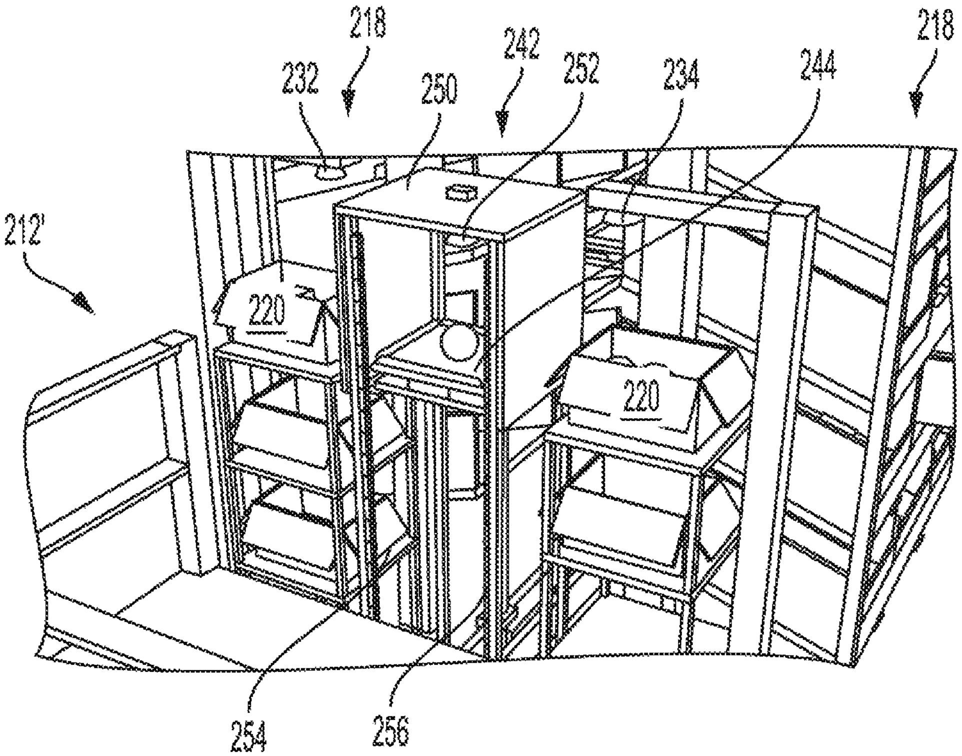
FIGS. 24A and 24B shows illustrative diagrammatic enlarged views of the semi-enclosed carrier loading area of the system of FIG. 23, showing the carrier present in the semi-enclosed carrier loading area (FIG. 24A) and showing the carrier having moved from the semi-enclosed carrier loading area (FIG. 24B)
Figure 24B:
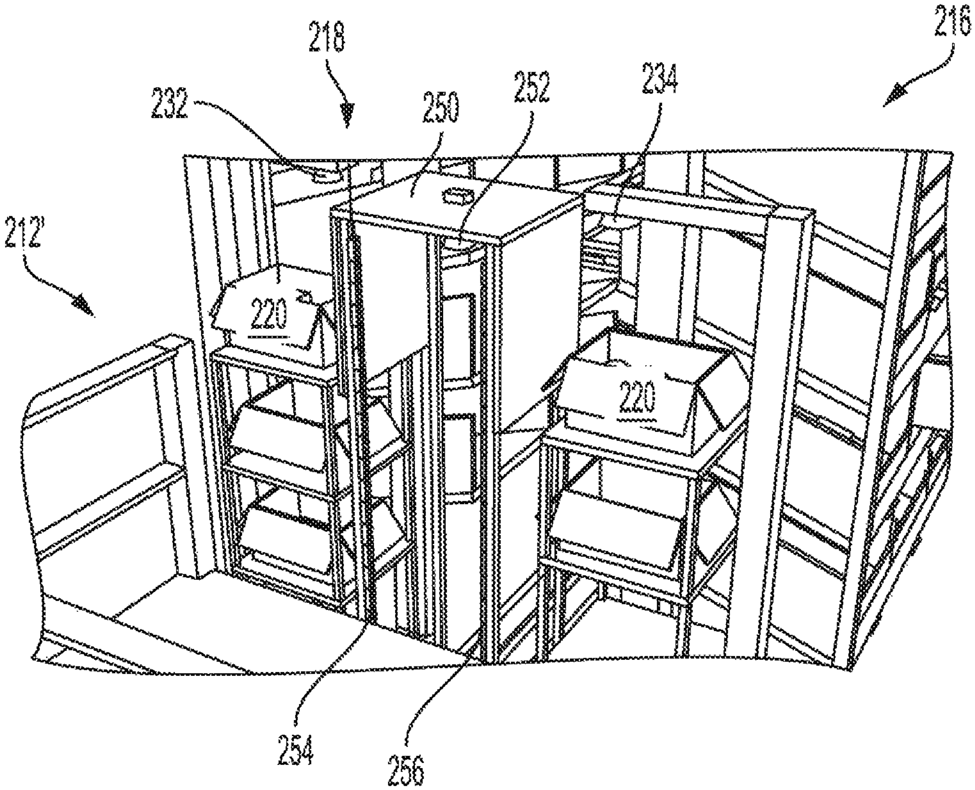

The semi-enclosed area 250 limits an amount of human activity near the carrier 244, and as further shown in FIGS. 24A and 24B, may include opposing bands of beam break sensors 254, 256 to identify when an object has been loaded, and to confirm that an operator's hand/arm has been withdrawn prior to moving the carrier 244. The beam break sensors may also extend fully below the semi-enclosed area 250 in order to detect whether anything (e.g., an operator's foot or leg) has entered the area below the semi-enclosed area 250 (triggering a stop condition). A further perception unit 252 may also be provided to confirm information regarding the object once placed on the carrier 244. Once on the carrier 244, objects are moved by the X-Z gantry of the object processing system to bring each object serially to one of the plurality of destination locations 260 as discussed in more detail above with reference to FIGS. 1-12.

Figure 25:
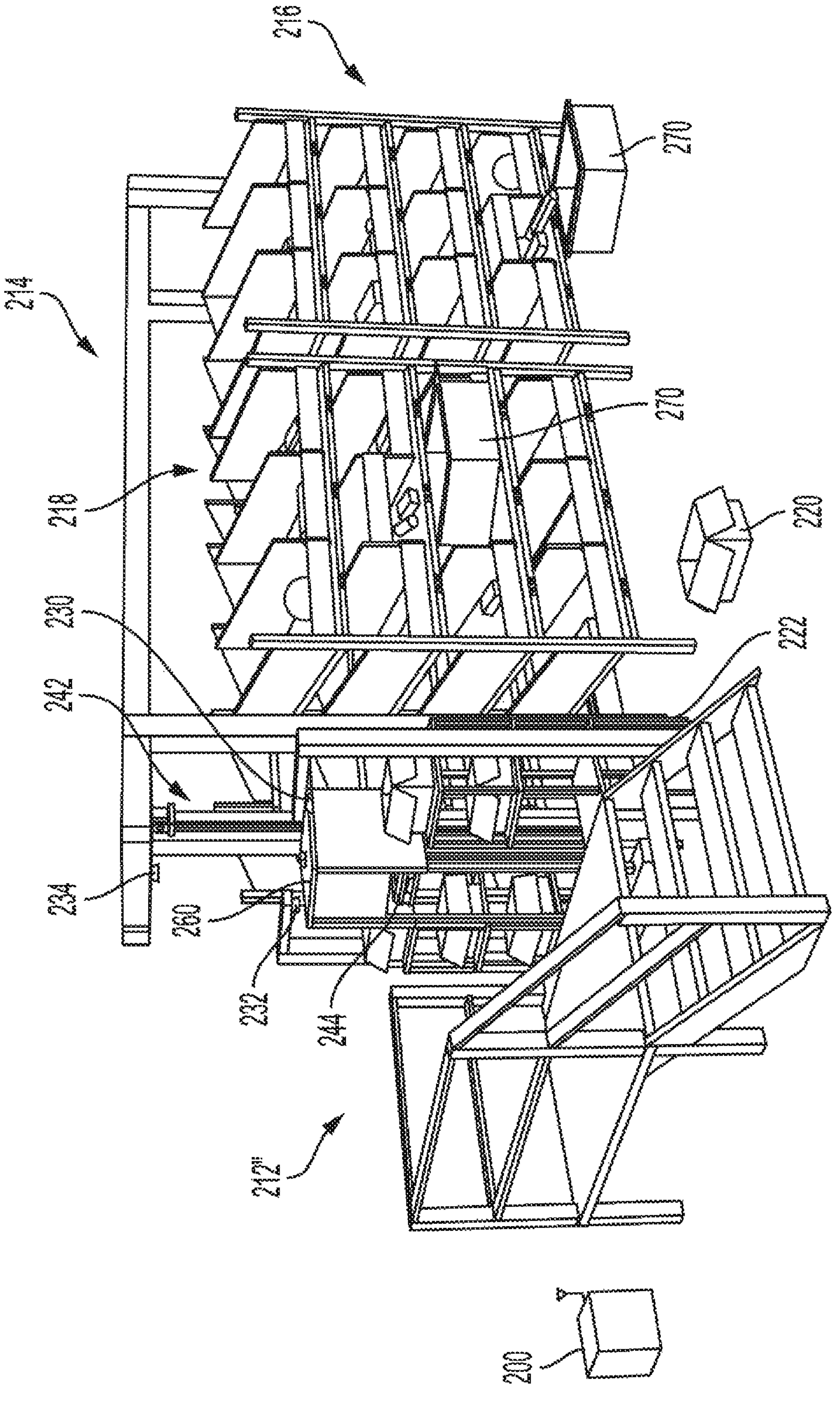
FIG. 25 shows an illustrative diagrammatic view of an operator inducted object processing system that includes a semi-enclosed carrier loading area in which the carrier is presented at the input area that includes a door in accordance with an aspect of the present invention.

FIG. 25 shows an operator inducted object processing system 210" in accordance with another aspect of the present invention that includes an object induction station 212" as well as an object processing system 214, and two object collection stations 216, 218 that are provided as a pair of arrays of destination locations 240 as discussed above. Similarly, during use, an operator may stand on the platform, and from boxes 220 that are positioned on supports 222 proximate the operator, objects may be removed from the boxes 220 and loaded one at a time directly onto a carrier 244. The object induction station 212" includes semi-enclosed area 250 that receives the carrier 244, on which an object may be loaded for delivery to any of the destination locations 240 as discussed above. In particular, once on the carrier 244, objects are moved by the X-Z gantry of the object processing system 214 to bring each object serially to one of the plurality of destination locations 260 as discussed in more detail above with reference to FIGS. 1-12.

Figure 26A:
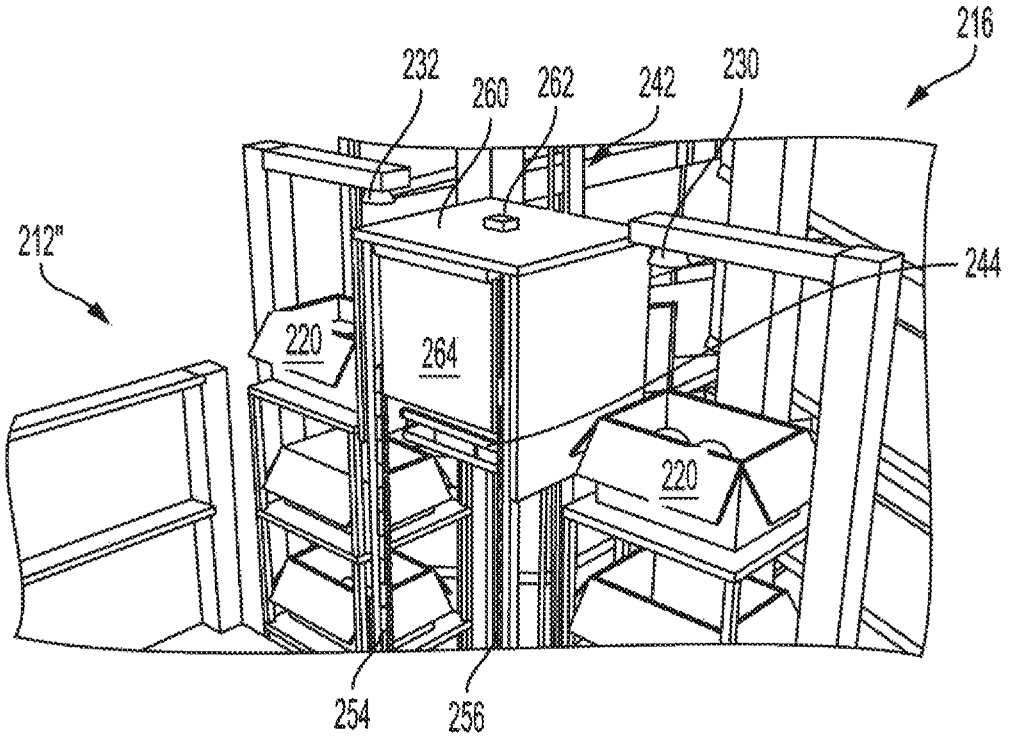
FIGS. 26A and 26B shows illustrative diagrammatic enlarged views of the semi-enclosed carrier loading area of the system of FIG. 25, showing the carrier present in the semi-enclosed carrier loading area with the door closed (FIG. 26A) and showing the carrier having moved from the semi-enclosed carrier loading area with the door opened (FIG. 26B)
Figure 26B:
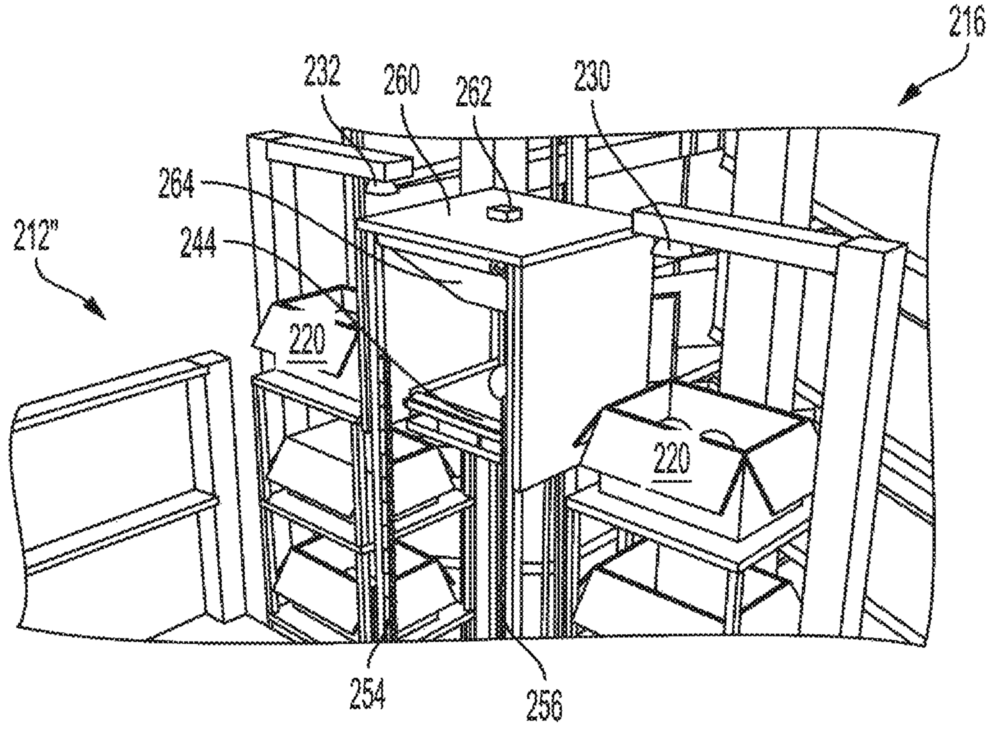

The semi-enclosed area 260 limits an amount of human activity near the carrier 244, and as further shown in FIGS. 26A and 26B, may include a door 264 and associated sensor(s) to confirm that an operator's hand/arm has been withdrawn prior to moving the carrier 244. The door 264 may be locked and become unlocked only when the carrier is in position to receive a new object and is not moving. A further perception unit 262 may also be provided to confirm information regarding the object once placed on the carrier 244, and beam break sensors may also be provided adjacent an area below the semi-enclosed area 260 similar to the system of FIGS. 24A and 24B. FIG. 26A shows the door 264 closed, and FIG. 26B shows the door 264 opened.

Figure 27:
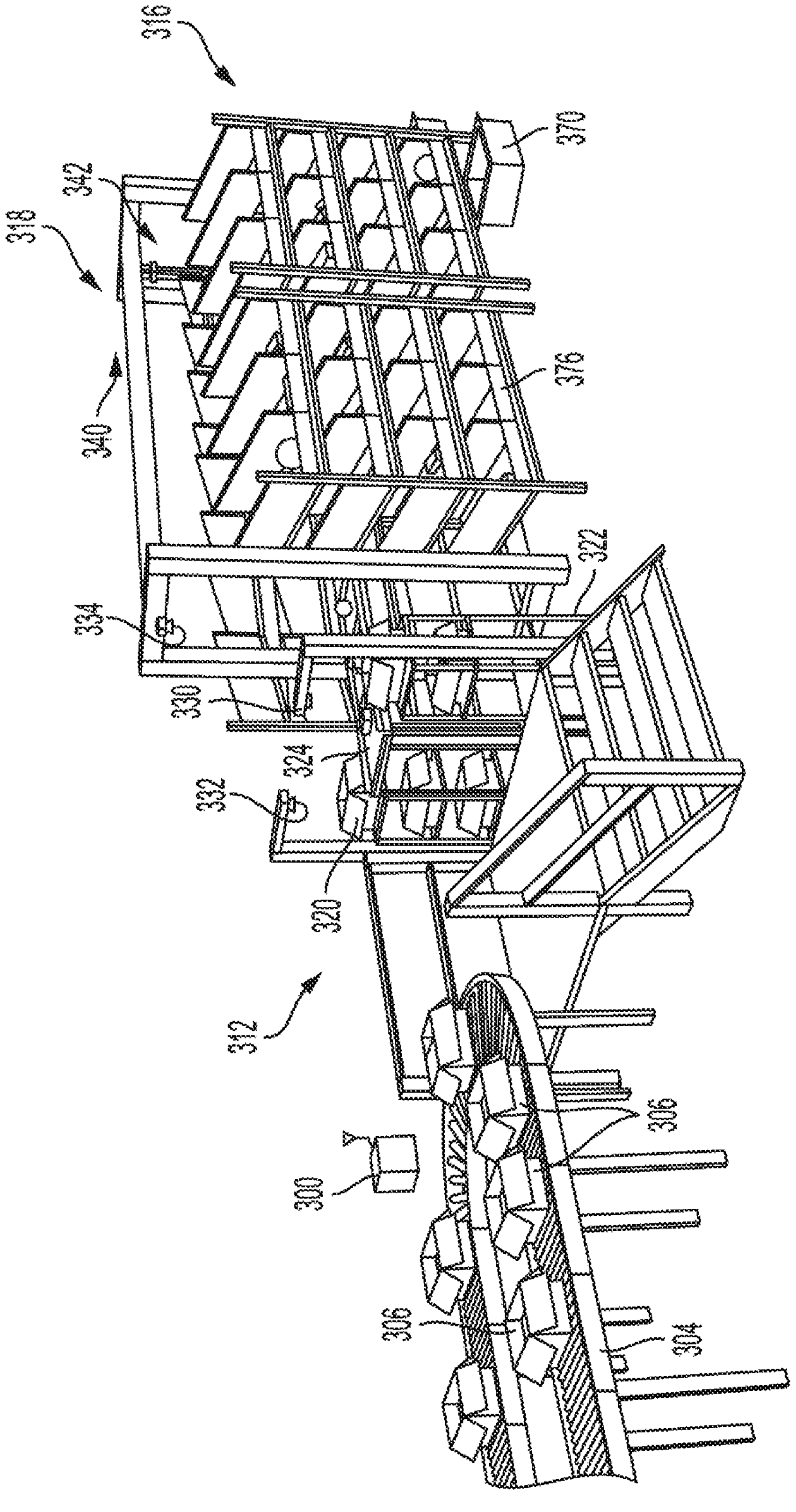
FIG. 27 shows an illustrative diagrammatic view of an operator inducted object processing system in accordance with an aspect of the present invention that includes an in-feed conveyor for providing input boxes.

As noted above, the system may include provision for providing full in-feed totes to the operator. FIG. 27 shows an operator inducted object processing system 310 in accordance with an aspect of the present invention that includes an object induction station 312, an object processing system 314, and two object collection stations 316, 138 that are provided as a pair of arrays of destination locations 360. During use, an operator may stand on the platform, and from boxes 320 that are positioned on supports 322 proximate the operator, objects may be removed from the boxes 320 and loaded one at a time onto a conveyor 324. One or more perception units 330, 332 may identify unique indicia on each object as it is lifted and placed onto the conveyor 324. A further perception system 334 above the conveyor 324 may also be used to verify the identity (and singularlity) of the selected object. In further aspects, the operator may scan each object individually with a hand-held scanner. In any event, the operator load station 312 is the place where the human operator selects and scans items for induction into the system.

The system 300 also includes an infeed conveyor 304 on which in-feed containers 306 (e.g., boxes, bins or totes) are provided to the station 312. There may further be provisions for further perception units such as barcode scanners, either fixed, handheld, or both. There may further be provision for mounting a touchscreen display or other HMI at the station 312. The station 312 may be located such that an operator can stand ergonomically, and can place items to the carrier. Once on the carrier 244, objects are moved by the X-Z gantry 340 of the object processing system 314 to bring each object serially to one of the plurality of destination locations 360 as discussed in more detail above with reference to FIGS. 1-12.

Similar to the systems discussed above, the gantry 340 includes a travelling vertical member 342 that moves horizontally along the gantry 340. The carrier 344 is mounted on the vertical member 342. The carrier 344 returns to a home position, receives an on object, and is then moved horizontally and vertically to a selected destination location, which may be emptied into containers 370 (e.g., bins, totes or boxes) as discussed above with reference to FIGS. 1-12. Operational control of the system is provided by one or more computer control systems 300 that communicate (wired or wirelessly) to the conveyors, perception units, gantry, carrier and input/output devices of the system.

Figure 28:
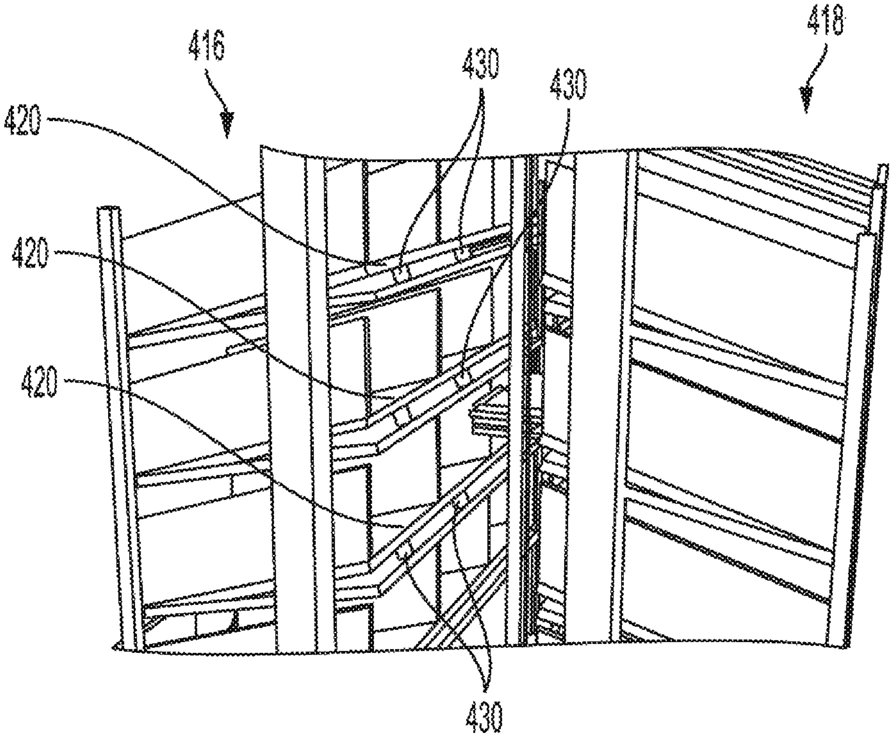
FIG. 28 shows an illustrative diagrammatic view of an operator inducted object processing system in accordance with an aspect of the present invention that includes adjustable angle shelves.

In accordance with further aspects, the systems above may be provided with adjustable shelves, each of which may be set to any of a variety of angles, presenting different contact forces to objects on the shelves. In this way, the system may either automatically adjust a shelf to accommodate objects that present different amounts of friction on the shelves, or may choose to place objects for certain orders on particular shelves that have an accommodating angle. FIG. 28, for example, shows an opposing pair of object collection stations 416, 418 that include shelves 420 that are adjustable in angle via pneumatic actuators 430.

In accordance with further aspects the shelves may be moved once all the locations are order complete, i.e., all items have been delivered to all orders in the mobile shelf unit. The size of the shelf balances the number of open destinations, size for practical moving and efficiency of moving things in accordance with certain aspects. Larger numbers of smaller shelves would require moving more shelves, taking more time, and be inefficient. Smaller numbers of larger shelves would be physically hard to move. In examples wherein the shelves may be removable, scanners or RFID tags may be provided to indicate to the system which shelf unit is present for tracking orders. Each shelf location on the mobile shelf unit may, for example, have a unique barcode.

Figure 29:
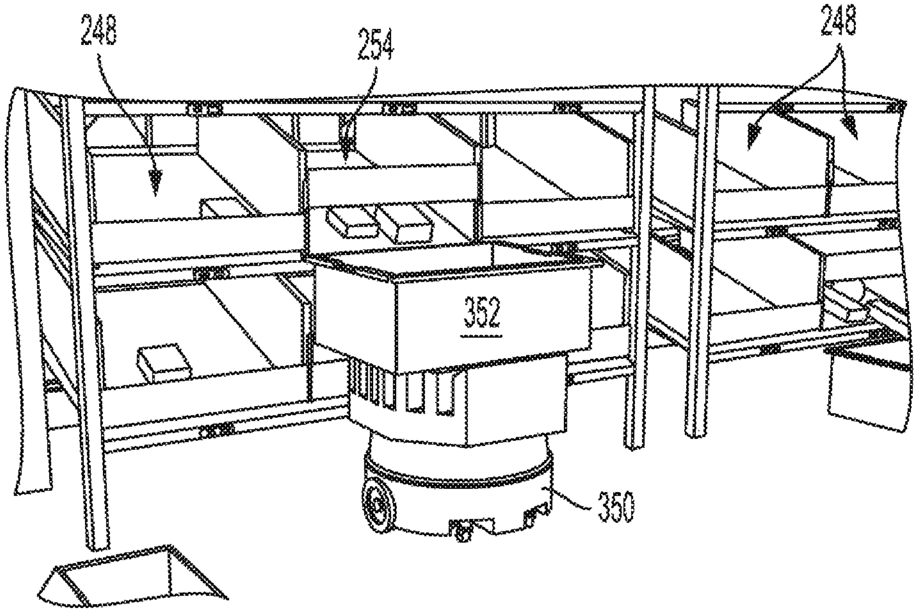
FIG. 29 shows an illustrative diagrammatic view of an operator inducted object processing system in accordance with an aspect of the present invention that includes container provided on mobile robotic systems.

In accordance with further aspects, the shelves may be accessed robotically. In further aspects, robotic systems may be provided that are able to remove objects into containers, or may remove containers themselves that are on each shelf. FIG. 29, for example, shows a robotic system unit 350 for presenting a container 352 to a shelving location 354 for removal of the objects in the angled shelf. The robotic system may include a plurality of robotic units with payloads at different heights to accommodate different shelving heights, or each robotic unit may include a payload elevator for adjusting the height of the payload to accommodate different shelving heights. In accordance with further aspects, the destination location may itself be a container that may be removed by a programmable motion device.

Figure 30:
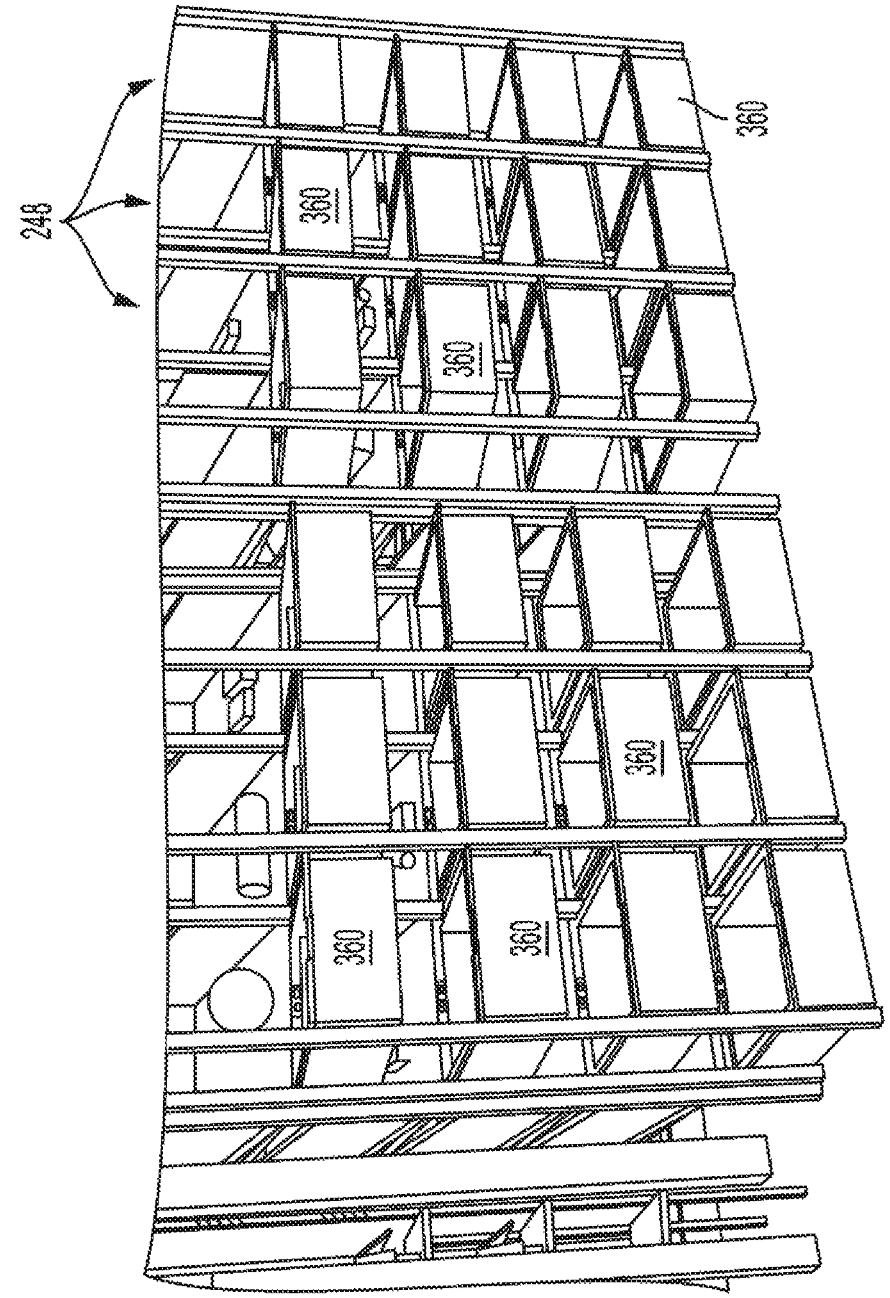
FIG. 30 shows an illustrative diagrammatic view of an operator inducted object processing system in accordance with an aspect of the present invention that includes containers at the output ends of each of the shelf destination locations.

The destination locations, in certain aspects, may also include containers. FIG. 30, for example shows containers 360 associated with each destination location such that objects fall directly into the associated container 360. The containers may then be removed by hand, or by use of an automated gantry system, or by mobile robot.

In accordance with various aspects, objects are assigned to destination locations, for example, by taking into account ergonomics for the human operator removing orders for outbound locations (e.g., putting heavy orders at chest height). In further aspects, software may be employed to assign outbound destinations to orders to improve throughput of the system.

Those skilled in the art will appreciate that numerous modifications and variations may be made to the above disclosed examples without departing from the spirit and scope of the present invention.

What is claimed is:

1. An operator inducted object processing system comprising:

an object induction station at which objects are provided for processing, said object induction station including at least one perception unit for providing perception data regarding an object;

an object processing system for receiving objects from the object induction station, said object processing system including a two-dimensional gantry with a carrier configured for movement in a first substantially horizontal direction between two mutually opposing arrays of destination locations, each of which extends along the first substantially horizontal direction, and the two-dimensional gantry with the carrier also being configured for movement in a second substantially vertical direction between the two mutually opposing arrays of destination locations, each of which also extends along the second substantially vertical direction, wherein the movement in the first substantially horizontal direction is independently powered by a horizontal motor and a vertical motor of the movement in the second substantially vertical direction, and wherein the carrier is further configured for movement in mutually opposing third directions that are substantially orthogonal to the first and second directions, for urging an object thereon into a first end of an adjacent selected destination location, each of the destination locations including a first end that is accessible by the carrier; and a plurality of object collection stations, each of which is associated with a second end of each of the destination locations.

2. The operator inducted object processing system as claimed in claim 1, wherein the object induction station includes a conveyor with a first end and a second end that is opposite the first end, the second end being proximate the object processing system.

3. The operator inducted object processing system as claimed in claim 1, wherein each destination location includes an inclined shelf that extends downward away from the object processing system.

4. The operator inducted object processing system as claimed in claim 1, wherein the carrier includes a conveyor.

5. The operator inducted object processing system as claimed in claim 4, wherein the conveyor of the carrier includes portions that are each separated from one another by cleats.

6. The operator inducted object processing system as claimed in claim 5, wherein the conveyor includes a pair of mutually opposing wall sections that extend along wall directions that are substantially parallel with the third directions.

7. The operator inducted object processing system as claimed in claim 1, wherein the system provides that the object is movable from the carrier to a selected destination location by traveling from the carrier over a gap prior to reaching the destination location.

8. The operator inducted object processing system as claimed in claim 1, wherein the conveyor is mounted on a transversely slidable stage that may be moved toward a destination location along a direction that is substantially parallel with the third direction.

9. The operator inducted object processing system as claimed in claim 8, wherein the transversely slidable stage is moveable responsive to object handling parameters regarding an object on the conveyor.

10. The operator inducted object processing system as claimed in claim 2, wherein movement of the conveyor is controlled based on a location of a selected destination location being accessed.

11. The operator inducted object processing system as claimed in claim 10, wherein movement of the conveyor is controlled further based on object handling parameters regarding an object on the carrier.

12. The operator inducted object processing system as claimed in claim 1, wherein each of the object collection stations includes a movable retaining member for retaining objects in the associated collection station.

13. The operator inducted object processing system as claimed in claim 12, wherein each movable retaining member includes an elastic member.

14. The operator inducted object processing system as claimed in claim 12, wherein each movable retaining member includes a slidable wall.

15. The operator inducted object processing system as claimed in claim 1, wherein a plurality of the destination locations include brace members to facilitate the positioning of any of a box, bin or tote adjacent each associated destination location.

16. The operator inducted object processing system as claimed in claim 1, wherein each of destination locations includes an interactive display regarding a status of the associated destination location.

17. The operator inducted object processing system as claimed in claim 16, wherein each interactive display shows an object count at the associated destination location.

18. The operator inducted object processing system as claimed in claim 16, wherein each interactive display includes an input system through which a user may confirm processing of objects at the associated destination location.

19. An operator inducted object processing system comprising:

an object induction station at which objects are provided for processing, said object induction station including a first end of a conveyor, and at least one perception unit for providing perception data regarding an object;

an object processing system including a second end of the conveyor, for receiving objects from the object induction station, said object processing system including a two-dimensional gantry with a carrier configured for movement in a first substantially horizontal direction adjacent an array of destination locations that extend along the first substantially horizontal direction, and the two-dimensional gantry with the carrier also being configured for movement in a second substantially vertical direction adjacent the array of destination locations that also extend along the second substantially vertical direction, wherein the movement in the first substantially horizontal direction is powered by a horizontal direction motor and the movement in the second substantially vertical direction is powered by a vertical direction motor, and wherein the carrier is further configured for movement in a third direction that is substantially orthogonal to the first and second directions, for urging an object thereon into a first end of an adjacent selected destination location, each of the destination locations including a first end that is accessible by the carrier; and a plurality of object collection stations, each of which is associated with a second end of each of the destination locations.

20. The operator inducted object processing system as claimed in claim 19, wherein the object induction station comprises a conveyor with a first end and a second end that is opposite the first end, the second end being proximate the object processing system.

21. The operator inducted object processing system as claimed in claim 19, wherein the object processing system further includes a further array of destination locations that extend along the first horizontal direction and extend along the second vertical direction.

22. The operator inducted object processing system as claimed in claim 19, wherein the carrier includes a cleated conveyor.

23. The operator inducted object processing system as claimed in claim 22, wherein each of the object collection stations includes a movable retaining member at a distal end of inclined shelf that extends generally downward from a proximal end of each inclined shelf that is proximate the object processing system.

24. The operator inducted object processing system as claimed in claim 22, wherein the cleated conveyor includes a pair of mutually opposing wall sections that extend along wall directions that are substantially parallel with the third directions.

25. The operator inducted object processing system as claimed in claim 19, wherein the system provides that the object is movable from the carrier to a selected destination location by traveling from the carrier over a gap prior to reaching the destination location.

26. The operator inducted object processing system as claimed in claim 19, wherein the conveyor is mounted on a transversely slidable stage that may be moved toward a destination location along a direction that is substantially parallel with the third direction.

27. The operator inducted object processing system as claimed in claim 26, wherein the transversely slidable stage is moveable responsive to object handling parameters regarding an object on the conveyor.

28. The operator inducted object processing system as claimed in claim 19, wherein movement of the conveyor is controlled based on a location of a selected destination location being accessed.

29. The operator inducted object processing system as claimed in claim 28, wherein movement of the conveyor is controlled further based on object handling parameters regarding an object on the carrier.

30. The operator inducted object processing system as claimed in claim 19, wherein each of the object collection stations includes a movable retaining member for retaining objects in the associated collection station.

31. The operator inducted object processing system as claimed in claim 30, wherein each movable retaining member includes an elastic member.

32. The operator inducted object processing system as claimed in claim 30, wherein each movable retaining member includes a slidable wall.

33. The operator inducted object processing system as claimed in claim 19, wherein a plurality of the destination locations include brace members to facilitate the positioning of any of a box, bin or tote adjacent each associated destination location.

34. The operator inducted object processing system as claimed in claim 19, wherein each of destination locations includes an interactive display regarding a status of the associated destination location.

35. The operator inducted object processing system as claimed in claim 34, wherein each interactive display shows an object count at the associated destination location.

36. The operator inducted object processing system as claimed in claim 34, wherein each interactive display includes an input system through which a user may confirm processing of objects at the associated destination location.

37. A method of processing objects comprising:

receiving objects at an object induction station at which objects are provided for processing, said object induction station including at least one perception unit for providing perception data regarding an object;

receiving objects from the object induction station on a carrier, the carrier being mounted on a two-dimensional gantry;

moving the two-dimensional gantry with the carrier simultaneously both in a first substantially horizontal direction using a horizontal direction motor between two mutually opposing arrays of destination locations, each of which extends along the first substantially horizontal direction, and in a second substantially vertical direction using a vertical direction motor between the two mutually opposing arrays of destination locations, each of which also extends along the second substantially vertical direction;

moving the carrier in either of mutually opposing third directions that are substantially orthogonal to the first and second directions, for urging an object thereon into a first end of an adjacent selected destination location, each of the destination locations including a first end that is accessible by the carrier; and receiving objects at a plurality of object collection stations, each of which is associated with a second end of each of the destination locations.

38. The method as claimed in claim 37, wherein the object induction station includes a conveyor with a first end and a second end that is opposite the first end, the second end being proximate the object processing system.

39. The method as claimed in claim 37, wherein each destination location includes a sloped inclined shelf that extends downward away from the object processing system.

40. The method as claimed in claim 37, wherein the carrier includes a cleated conveyor.

41. The method as claimed in claim 40, wherein the conveyor of the carrier includes portions that are each separated from one another by cleats.

42. The method as claimed in claim 41, wherein the conveyor includes a pair of mutually opposing wall sections that extend along wall directions that are substantially parallel with the third directions.

43. The method as claimed in claim 37, wherein the method provides that the object is movable from the carrier to a selected destination location by traveling from the carrier over a gap prior to reaching the destination location.

44. The method as claimed in claim 37, wherein the conveyor is mounted on a transversely slidable stage that may be moved toward a destination location along a direction that is substantially parallel with the third direction.

45. The method as claimed in claim 44, wherein the transversely slidable stage is moveable responsive to object handling parameters regarding an object on the conveyor.

46. The method as claimed in claim 37, wherein the receiving objects includes movement of a conveyor that is controlled based on a location of a selected destination location being accessed.

47. The method as claimed in claim 46, wherein movement of the conveyor is controlled further based on object handling parameters regarding an object on the carrier.

48. The method as claimed in claim 37, wherein each of the object collection stations includes a movable retaining member for retaining objects in the associated collection station.

49. The method as claimed in claim 48, wherein each movable retaining member includes an elastic member.

50. The method as claimed in claim 48, wherein each movable retaining member includes a slidable wall.

51. The method as claimed in claim 37, wherein a plurality of the destination locations include brace members to facilitate the positioning of any of a box, bin or tote adjacent each associated destination location.

52. The method as claimed in claim 37, wherein each of destination locations includes an interactive display regarding a status of the associated destination location.

53. The method as claimed in claim 51, wherein each interactive display shows an object count at the associated destination location.

54. The method as claimed in claim 51, wherein each interactive display includes an input system through which a user may confirm processing of objects at the associated destination location.

55. The method as claimed in claim 37, wherein the receiving objects at the object induction station includes triggering at least one beam break.

56. The method as claimed in claim 37, wherein the receiving objects at the object induction station includes moving a push door.

* * * * *